(12) United States Patent
Wei et al.

(10) Patent No.: US 12,640,873 B2
(45) Date of Patent: May 26, 2026

(54) PILOT SYMBOL TRANSMISSION METHOD AND APPARATUS

(71) Applicant: HUAWEI TECHNOLOGIES CO., LTD., Shenzhen (CN)

(72) Inventors: Fan Wei, Shenzhen (CN); Lei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 18/358,472

(22) Filed: Jul. 25, 2023

(65) Prior Publication Data

US 2023/0370225 A1 Nov. 16, 2023

Related U.S. Application Data

(63) Continuation of application No. PCT/CN2022/073254, filed on Jan. 21, 2022.

(30) Foreign Application Priority Data

Jan. 29, 2021 (CN) .......................... 202110127382.4

(51) Int. Cl.
  *H04L 5/00* (2006.01)
  *H04J 13/10* (2011.01)
(52) U.S. Cl.
  CPC ............ *H04L 5/0048* (2013.01); *H04J 13/10* (2013.01); *H04L 5/0094* (2013.01)
(58) Field of Classification Search
  CPC ... H04L 5/0048; H04L 5/0094; H04L 5/0053; H04L 27/2646; H04L 5/0005;
  (Continued)

(56) References Cited

U.S. PATENT DOCUMENTS

2009/0279623 A1* 11/2009 Wu ........................ H04L 5/0023
                                                           375/260
2010/0215114 A1 8/2010 Kim et al.
                       (Continued)

FOREIGN PATENT DOCUMENTS

CN        102142918 A    8/2011
WO     2014051198 A1     4/2014

OTHER PUBLICATIONS

International Search Report issued in corresponding International Application No. PCT/CN2022/073254, dated Mar. 29, 2022, pp. 1-9.

(Continued)

*Primary Examiner* — Chae S Lee
(74) *Attorney, Agent, or Firm* — HAUPTMAN HAM, LLP

(57) ABSTRACT

Embodiments of this application relate to the field of wireless communication technologies, including the field of Wi-Fi technologies, and provide a pilot symbol transmission method and an apparatus, to reduce a possibility that pilots sent by different users in a network collide. In the method, a terminal device may send a codeword, and the codeword may include a pilot symbol and a data symbol. The pilot symbol may include a non-zero pilot symbol and a zero pilot symbol, and the data symbol may include a non-zero data symbol and a zero data symbol. According to the foregoing solutions, the pilot symbol sent by the terminal device may include the non-zero pilot symbol and the zero pilot symbol, so that the pilot symbol sent by the terminal device is sparse.

20 Claims, 7 Drawing Sheets

(58) Field of Classification Search
CPC ............. H04L 5/0044; H04L 27/26035; H04L
27/2613; H04L 5/0062; H04J 13/10
See application file for complete search history.

(56) References Cited

U.S. PATENT DOCUMENTS

| | | | |
|---|---|---|---|
| 2016/0329998 A1* | 11/2016 | Li | H04L 27/2636 |
| 2018/0014320 A1* | 1/2018 | Xu | H04L 5/0048 |
| 2018/0048443 A1* | 2/2018 | Xu | H04L 5/0048 |

OTHER PUBLICATIONS

Extended European Search Report issued in corresponding European Application No. 22745162.2, dated May 7, 2024, pp. 1-10.

* cited by examiner

| | |
|---|---|
| ▨ | Uplink pilot |
| ▦ | Uplink data |
| ⊞ | Downlink data |

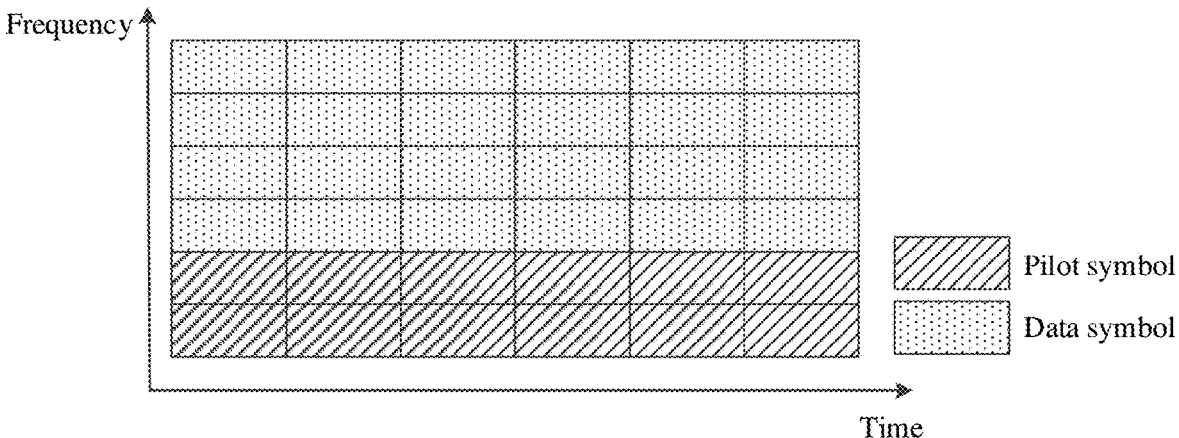
FIG. 3D
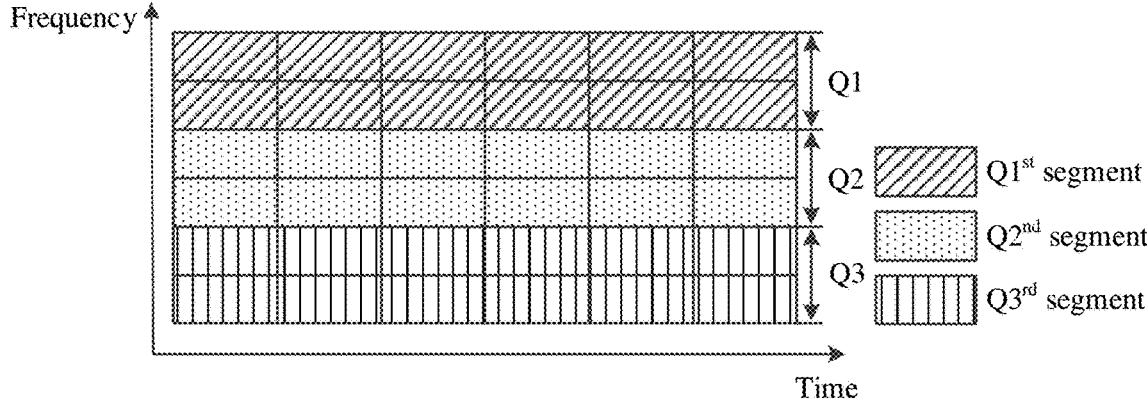
FIG. 4A
FIG. 4B

Apparatus 900

PILOT SYMBOL TRANSMISSION METHOD AND APPARATUS

CROSS-REFERENCE TO RELATED APPLICATIONS

This application is a continuation of International Application No. PCT/CN2022/073254, filed on Jan. 21, 2022, which claims priority to Chinese Patent Application No. 202110127382.4, filed on Jan. 29, 2021. The disclosures of the aforementioned applications are hereby incorporated by reference in their entireties.

TECHNICAL FIELD

This application relates to the field of wireless communication technologies, and in particular, to a pilot symbol transmission method and an apparatus.

BACKGROUND

With continuous development of a digital network, uplink multi-user and large-capacity transmission services such as mobile video backhaul are widely used in 5G and future B5G networks. Limited by bandwidths and spectral efficiency of the 5G and future B5G systems, the system has a bottleneck in improving a throughput. A multiple-input multiple-output (MIMO) technology is a key technology for improving a system throughput, and is to increase spectral efficiency of a system by deploying massive antennas on a base station side. However, channel estimation in the MIMO requires a large quantity of pilot overheads. As a quantity of users in a network continuously increases, different users may select a same pilot sequence. Because the users send pilots at a fixed and same location, pilot collision occurs.

SUMMARY

Embodiments of this application provide a pilot symbol transmission method and an apparatus, to reduce a possibility that pilots sent by different users in a network collide.

According to a first aspect, a pilot symbol transmission method is provided. The method may be performed by a terminal device or a chip with similar functions of the terminal device. In the method, the terminal device may receive a pilot parameter from a network device. The pilot parameter may be used by the terminal device to generate a pilot symbol. The terminal device may send a codeword, and the codeword may include the pilot symbol and a data symbol. The pilot symbol may include a non-zero pilot symbol and a zero pilot symbol, and the data symbol may include a non-zero data symbol and a zero data symbol.

According to the foregoing solutions, the pilot symbol sent by the terminal device may include the non-zero pilot symbol and the zero pilot symbol, so that the pilot symbol sent by the terminal device is sparse. Time-frequency locations of resource blocks occupied by the non-zero pilot symbol and time-frequency locations of resource blocks occupied by the zero pilot symbol are arranged and combined, to obtain a plurality of pilot patterns. Based on the sparseness, a quantity of pilot patterns may be increased, to reduce a possibility of pilot collision. Due to randomness of arrival of a service of the terminal device and randomness of a selected pilot pattern, a possibility that pilots on a same time-frequency resource collide can be reduced, interference to channel estimation is reduced, and channel estimation precision can be improved. To reduce interference between users in multiple access, the data symbol sent by the terminal device may also be sparse.

In a possible implementation, a quantity of resource blocks occupied by the pilot symbol is $L_0$, and a quantity of resource blocks occupied by the non-zero pilot symbol is $N_0$. A quantity of resource blocks occupied by the data symbol is $L_1$, and a quantity of resource blocks occupied by the non-zero data symbol is $N_1$. A sum of the quantity $L_0$ of resource blocks occupied by the pilot symbol and the quantity $L_1$ of resource blocks occupied by the data symbol is k times a sum of the quantity $N_0$ of resource blocks occupied by the non-zero pilot symbol and the quantity $N_1$ of resource blocks occupied by the non-zero data symbol, where k is greater than or equal to 4.

According to the foregoing solutions, when k is greater than or equal to 4, more pilot patterns may be obtained. Therefore, there is a low probability that pilots on a same time-frequency resource collide, to reduce channel estimation interference.

In a possible implementation, k is less than or equal to 10. According to the foregoing solutions, when k is less than or equal to 10, a value of $L_0$ does not need to be large. Therefore, more pilot patterns may be obtained, and transmission resources can be reduced.

In a possible implementation, the terminal device may determine, based on a unique user identifier, a time domain location and a frequency domain location of the resource block occupied by the non-zero pilot symbol.

According to the foregoing solutions, because the unique user identifier is an identifier that can uniquely identify the terminal device, and unique user identifiers of different terminal devices are different, time domain locations and frequency domain locations of resource blocks occupied by non-zero pilot symbols sent by different terminal devices are different, to avoid pilot collision on a same time domain resource.

In a possible implementation, the terminal device may convert the unique user identifier into a decimal index i. The terminal device may determine a maximum value $n_j$, so that $$C_{n_j}^j \leq i, \text{ where } n_j > j, j = N_0, \text{ and } N_0$$

is a quantity of non-zero pilot symbols. The terminal device may update values of i and j, where $$i = i - C_{n_j}^j, \text{ and } j = j - 1;$$

return to perform the step of determining the maximum value $n_j$, so that $$C_{n_j}^j \leq i;$$

and when obtaining $N_0$ $n_j$ values, determine, based on a plurality of determined $n_j$ values, time domain locations and frequency domain locations of the resource blocks occupied by the $N_0$ non-zero pilot symbols.

According to the foregoing solutions, the terminal device may separately determine, by using the foregoing algorithm, the time domain locations and the frequency domain locations of the resource blocks occupied by the $N_0$ non-zero pilot symbols, to determine, based on the unique user identifier, the time domain locations and the frequency domain locations of the resource blocks occupied by the non-zero pilot symbol.

In a possible implementation, a time domain resource of the resource block occupied by the pilot symbol is before a time domain resource of the resource block occupied by the data symbol; a frequency domain resource of the resource block occupied by the pilot symbol is before a frequency domain resource of the resource block occupied by the data symbol; a time domain resource of the resource block occupied by the pilot symbol is after a time domain resource of the resource block occupied by the data symbol; or a frequency domain resource of the resource block occupied by the pilot symbol is after a frequency domain resource of the resource block occupied by the data symbol.

According to the foregoing solutions, the pilot symbols may be placed in a central manner, and the pilot symbol may not include the data symbol, so that the network device can easily determine a location or an area of the pilot symbol.

In a possible implementation, the codeword may include Q resource block sets. A $q^{th}$ resource block set includes the resource block occupied by the pilot symbol and the resource block occupied by the data symbol.

$$\sum_{q=1}^{Q} N_{q0} = N_0,$$

$N_{q0}$ is a quantity of resource blocks, in the $q^{th}$ resource block set, occupied by the non-zero pilot symbol, $N_0$ is a total quantity of resource blocks, in the Q resource block sets, occupied by the non-zero pilot symbol, Q is an integer greater than or equal to 1, $N_0$ is greater than or equal to 1, $N_{q0}$ is greater than or equal to 0, and less than or equal to $N_0$, and q belongs to [1, Q].

According to the foregoing solutions, the pilot symbols may be distributed between the data symbols, to avoid poor performance of receiving the pilot symbols due to poor quality of some channels during codeword transmission. The pilot symbols are distributed between the data symbols, to obtain a transmission gain, and improve transmission performance of the pilot symbols.

In a possible implementation, the terminal device may divide the unique user identifier into Q segments, to obtain Q unique user identifier segments. The terminal device may determine, based on a $q^{th}$ unique user identifier segment, a time domain location and a frequency domain location of the resource block, in a $q^{th}$ resource block set, occupied by the non-zero pilot symbol.

According to the foregoing solutions, when the pilot symbols sent by the terminal device are distributed in the plurality of resource block sets, the terminal device may divide the unique user identifier, and determine, based on each segment of the unique user identifier, a time domain resource and a frequency domain resource of a resource block, in a corresponding resource block set, occupied by the non-zero pilot symbol.

In a possible implementation, a time domain location and a frequency domain location of the resource block, in an $m^{th}$ resource block set, occupied by the non-zero pilot symbol may be different from a time domain location and a frequency domain location of the resource block, in an $n^{th}$ resource block set, occupied by the non-zero pilot symbol. The $m^{th}$ resource block set and the $n^{th}$ resource block set are two of the Q resource block sets.

In the current pilot symbol, if the pilot symbol is divided, time-frequency locations of resource blocks occupied by different segments of the pilot symbol are the same. Therefore, even if the time-frequency locations of the resource blocks occupied by the pilot symbols are determined based on the unique user identifier, if first several bits of unique user identifiers of the two terminal devices are the same, determined pilot patterns are the same. According to the foregoing solutions, the unique user identifier is divided, and segments of the unique user identifier are used to separately determine time-frequency locations of resource blocks occupied by the non-zero pilot symbols in segments of different pilot symbols. Even if first several bits of unique user identifiers of two terminal devices are the same, because the unique user identifiers of the two terminal devices cannot be completely the same, determined pilot patterns are also different, to reduce a possibility that pilot patterns collide.

In a possible implementation, the pilot parameter may include the quantity of resource blocks occupied by the non-zero pilot symbol and the total quantity of resource blocks occupied by the pilot symbol in the codeword.

According to the foregoing solutions, the network device may indicate, to the terminal device, the quantity of resource blocks occupied by the non-zero pilot symbol and the quantity of resource blocks occupied by the pilot symbol. The network device may determine sparseness of the pilot symbols and the data symbols, to indicate the sparseness of the pilot symbol and the data symbol to the terminal device based on the quantity of terminal devices currently accessing a network, so as to improve flexibility.

In a possible implementation, the pilot parameter may include a value of Q, the quantity of resource blocks, in the $q^{th}$ resource block set, occupied by the non-zero pilot symbol, and the total quantity of resource blocks, in the $q^{th}$ resource block set, occupied by the pilot symbol.

According to the foregoing solutions, the network device may indicate, to the terminal device, the quantity of resource blocks occupied by the non-zero pilot symbol and the quantity of resource blocks occupied by the pilot symbol. The network device may determine sparseness of the pilot symbols and the data symbols, to indicate the sparseness of the pilot symbol and the data symbol to the terminal device based on the quantity of terminal devices currently accessing a network, so as to improve flexibility.

In a possible implementation, the pilot parameter may further include a type of the pilot symbol. A type of the non-zero pilot symbol is the same as the type of the pilot symbol.

According to the foregoing solutions, the non-zero pilot symbol sent by the terminal device may be specified by the network device.

According to a second aspect, a pilot symbol transmission method is provided. The method may be performed by a network device or a chip with similar functions of the network device. In the method, the network device may send a pilot parameter to a terminal device. The pilot parameter may be used by the terminal device to generate a pilot symbol. The network device may receive a codeword from the terminal device. The codeword may include the pilot symbol and a data symbol. The pilot symbol may include a non-zero pilot symbol and a zero pilot symbol, and the data symbol may include a non-zero data symbol and a zero data symbol.

In a possible implementation, a quantity of resource blocks occupied by the pilot symbol is $L_0$, and a quantity of resource blocks occupied by the non-zero pilot symbol is $N_0$. A quantity of resource blocks occupied by the data symbol is $L_1$, and a quantity of resource blocks occupied by the non-zero data symbol is $N_1$. A sum of the quantity $L_0$ of resource blocks occupied by the pilot symbol and the quantity $L_1$ of resource blocks occupied by the data symbol is k times a sum of the quantity $N_0$ of resource blocks occupied by the non-zero pilot symbol and the quantity $N_1$ of resource blocks occupied by the non-zero data symbol, where k is greater than or equal to 4.

In a possible implementation, k is less than or equal to 10.

In a possible implementation, the network device may perform joint channel estimation and decoding based on the pilot symbol and a received signal. According to the foregoing solutions, the network device may simultaneously perform channel estimation and decoding based on the pilot symbol and the received signal, to improve efficiency of decoding the codeword by the network device.

In a possible implementation, the network device may determine a unique user identifier of the terminal device based on a time domain location and a frequency domain location of the resource block occupied by the non-zero pilot symbol.

In a possible implementation, a time domain resource of the resource block occupied by the pilot symbol is before a time domain resource of the resource block occupied by the data symbol; a frequency domain resource of the resource block occupied by the pilot symbol is before a frequency domain resource of the resource block occupied by the data symbol; a time domain resource of the resource block occupied by the pilot symbol is after a time domain resource of the resource block occupied by the data symbol; a frequency domain resource of the resource block occupied by the pilot symbol is after a frequency domain resource of the resource block occupied by the data symbol; a time domain resource of the resource block occupied by the pilot symbol is before a time domain resource of the resource block occupied by the data symbol, and a frequency domain resource of the resource block occupied by the pilot symbol is before a frequency domain resource of the resource block occupied by the data symbol; or a time domain resource of the resource block occupied by the pilot symbol is after a time domain resource of the resource block occupied by the data symbol, and a frequency domain resource of the resource block occupied by the pilot symbol is after a frequency domain resource of the resource block occupied by the data symbol.

In a possible implementation, the pilot parameter may include the quantity $N_0$ of resource blocks occupied by the non-zero pilot symbol and the total quantity $L_0$ of resource blocks occupied by the pilot symbol in the codeword.

In a possible implementation, the codeword may include Q resource block sets.

$$\sum_{q=1}^{Q} N_{q0} = N_0$$

$N_{q0}$ is a quantity of resource blocks, in the $q^{th}$ resource block set, occupied by the non-zero pilot symbol, $N_0$ is a total quantity of resource blocks, in the Q resource block sets, occupied by the non-zero pilot symbol, Q is an integer greater than or equal to 1, $N_0$ is greater than or equal to 1, $N_{q0}$ is greater than or equal to 0, and less than or equal to $N_0$, and q belongs to [1, Q].

According to a third aspect, a communication apparatus is provided. The apparatus may include modules/units configured to perform the method in any one of the first aspect or the possible implementations of the first aspect, or may further include modules/units configured to perform the method in any one of the second aspect or the possible implementations of the second aspect. For example, the communication apparatus includes a processing unit and a transceiver unit.

For example, when the apparatus includes modules/units configured to perform the method in any one of the first aspect or the possible implementations of the first aspect, the transceiver unit is configured to receive a pilot parameter from a network device, where the pilot parameter is used to generate a pilot symbol. The processing unit is configured to generate a codeword, where the codeword includes the pilot symbol and a data symbol, the pilot symbol includes a non-zero pilot symbol and a zero pilot symbol, and the data symbol includes a non-zero data symbol and a zero data symbol. The transceiver unit is configured to send the codeword to the network device.

In a possible implementation, a quantity of resource blocks occupied by the pilot symbol is $L_0$, a quantity of resource blocks occupied by the non-zero pilot symbol is $N_0$, a quantity of resource blocks occupied by the data symbol is $L_1$, a quantity of resource blocks occupied by the non-zero data symbol is $N_1$, a sum of the quantity of resource blocks occupied by the pilot symbol and the quantity of resource blocks occupied by the data symbol is k times a sum of the quantity of resource blocks occupied by the non-zero pilot symbol and the quantity of resource blocks occupied by the non-zero data symbol, and k is greater than or equal to 4.

In a possible implementation, k is less than or equal to 10.

In a possible implementation, the processing unit is further configured to determine, based on a unique user identifier, a time domain location and a frequency domain location of the resource block occupied by the non-zero pilot symbol.

In a possible implementation, the processing unit is specifically configured to: convert the unique user identifier into a decimal index i; determine a maximum value $n_j$, so that $$C_{n_j}^{j} \le i, \text{ where } n_j > j, j = N_0, \text{ and } N_0$$

is a quantity of non-zero pilot symbols; update values of i and j, where $$i = i - C_{n_j}^{j}, \text{ and } j = j - 1;$$

return to perform the step of determining the maximum value $n_j$, so that $$C_{n_j}^{i} \le i;$$

and when determining that there is no maximum value $n_j$ to set $$C_{n_j}^{j} \le i,$$

determine, based on a plurality of determined $n_j$ values, time domain locations and frequency domain locations of the resource blocks occupied by the $N_0$ non-zero pilot symbols.

In a possible implementation, a time domain resource of the resource block occupied by the pilot symbol is before a time domain resource of the resource block occupied by the data symbol; a frequency domain resource of the resource block occupied by the pilot symbol is before a frequency domain resource of the resource block occupied by the data symbol; a time domain resource of the resource block occupied by the pilot symbol is after a time domain resource of the resource block occupied by the data symbol; or a frequency domain resource of the resource block occupied by the pilot symbol is after a frequency domain resource of the resource block occupied by the data symbol.

In a possible implementation, the codeword includes Q resource block sets, a $q^{th}$ resource block set includes the resource block occupied by the pilot symbol and the resource block occupied by the data symbol, $$\sum\nolimits_{q=1}^{Q} N_{q0} = N_0,$$

$N_{q0}$ is a quantity of resource blocks, in the $q^{th}$ resource block set, occupied by the non-zero pilot symbol, $N_0$ is a total quantity of resource blocks, in the Q resource block sets, occupied by the non-zero pilot symbol, Q is an integer greater than or equal to 1, $N_0$ is greater than or equal to 1, $N_{q0}$ is greater than or equal to 0, and less than or equal to $N_0$, and q belongs to [1, Q].

For example, when the apparatus includes modules/units configured to perform the method in any one of the second aspect or the possible implementations of the second aspect, the transceiver unit is configured to send a pilot parameter from a terminal device, where the pilot parameter is used by the terminal device to generate a pilot symbol. The transceiver unit is further configured to receive a codeword from the terminal device, where the codeword includes the pilot symbol and a data symbol, the pilot symbol includes a non-zero pilot symbol and a zero pilot symbol, and the data symbol includes a non-zero data symbol and a zero data symbol. The processing unit is configured to decode the codeword, to determine the data symbol.

In a possible implementation, a quantity of resource blocks occupied by the pilot symbol is $L_0$, a quantity of resource blocks occupied by the non-zero pilot symbol is $N_0$, a quantity of resource blocks occupied by the data symbol is $L_1$, a quantity of resource blocks occupied by the non-zero data symbol is $N_1$, a sum of the quantity of resource blocks occupied by the pilot symbol and the quantity of resource blocks occupied by the data symbol is k times a sum of the quantity of resource blocks occupied by the non-zero pilot symbol and the quantity of resource blocks occupied by the non-zero data symbol, and k is greater than or equal to 4.

In a possible implementation, k is less than or equal to 10.

In a possible implementation, the processing unit is further configured to determine a unique user identifier of the terminal device based on a time domain location and a frequency domain location of the resource block occupied by the non-zero pilot symbol.

In a possible implementation, a time domain resource of the resource block occupied by the pilot symbol is before a time domain resource of the resource block occupied by the data symbol; a frequency domain resource of the resource block occupied by the pilot symbol is before a frequency domain resource of the resource block occupied by the data symbol; a time domain resource of the resource block occupied by the pilot symbol is after a time domain resource of the resource block occupied by the data symbol; a frequency domain resource of the resource block occupied by the pilot symbol is after a frequency domain resource of the resource block occupied by the data symbol; a time domain resource of the resource block occupied by the pilot symbol is before a time domain resource of the resource block occupied by the data symbol, and a frequency domain resource of the resource block occupied by the pilot symbol is before a frequency domain resource of the resource block occupied by the data symbol; or a time domain resource of the resource block occupied by the pilot symbol is after a time domain resource of the resource block occupied by the data symbol, and a frequency domain resource of the resource block occupied by the pilot symbol is after a frequency domain resource of the resource block occupied by the data symbol.

In a possible implementation, the codeword includes Q resource block sets, a $q^{th}$ resource block set includes the resource block occupied by the pilot symbol and the resource block occupied by the data symbol, $$\sum\nolimits_{q=1}^{Q} N_{q0} = N_0,$$

$N_{q0}$ is a quantity of resource blocks, in the $q^{th}$ resource block set, occupied by the non-zero pilot symbol, $N_0$ is a total quantity of resource blocks, in the Q resource block sets, occupied by the non-zero pilot symbol, Q is an integer greater than or equal to 1, $N_0$ is greater than or equal to 1, $N_{q0}$ is greater than or equal to 0, and less than or equal to $N_0$, and q belongs to [1, Q].

According to a fourth aspect, a communication apparatus is provided. The communication apparatus includes a processor and a transceiver. The transceiver performs sending and receiving steps of the method in any one of the first aspect or the possible implementations of the first aspect, or sending and receiving steps of the method in any one of the second aspect or the possible implementations of the second aspect. When a controller runs, the processor performs, by using a hardware resource in the controller, the processing step other than the sending and receiving steps in the method in any one of the first aspect or the possible implementations of the first aspect, or performs the processing step other than the sending and receiving steps in the method in any one of the second aspect or the possible implementations of the second aspect.

In a possible implementation, the communication apparatus further includes a memory. The memory may be located inside the apparatus, or may be located outside the apparatus, and is connected to the apparatus.

In a possible implementation, the memory may be integrated with the processor.

According to a fifth aspect, a chip is provided. The chip includes a logic circuit and a communication interface.

In a design, the communication interface is configured to input a pilot parameter from a network device, and output a codeword. The logic circuitry is configured to generate the codeword based on the pilot parameter. The codeword includes the pilot symbol and a data symbol. The pilot symbol includes a non-zero pilot symbol and a zero pilot symbol, and the data symbol includes a non-zero data symbol and a zero data symbol. The communication interface is configured to output the codeword.

In a design, the communication interface is configured to output a pilot parameter. The communication interface is further configured to input a codeword from a terminal device. The codeword includes a pilot symbol and a data symbol. The pilot symbol includes a non-zero pilot symbol and a zero pilot symbol, and the data symbol includes a non-zero data symbol and a zero data symbol. The logic circuit is configured to decode the codeword, to determine the data symbol.

According to a sixth aspect, this application provides a computer-readable storage medium. The computer-readable storage medium stores instructions, and when the instructions are run on a computer, the computer is enabled to perform the methods in the foregoing aspects.

According to a seventh aspect, this application provides a computer program product storing instructions. When the computer program product is run on a computer, the computer is enabled to perform methods described in the foregoing aspects.

According to an eighth aspect, this application provides a communication system, including at least one terminal device and at least one network device.

In addition, for beneficial effect of the second aspect to the seventh aspect, refer to the beneficial effect shown in the first aspect.

BRIEF DESCRIPTION OF DRAWINGS

FIG. 3D is a schematic diagram of a time-frequency location of a resource block occupied by a pilot symbol and a time-frequency location of a resource block occupied by a data symbol according to an embodiment of this application;

FIG. 4A is a schematic diagram of a codeword dividing manner according to an embodiment of this application;

FIG. 4B is a schematic diagram of a codeword dividing manner according to an embodiment of this application;

DESCRIPTION OF EMBODIMENTS

Terms "system" and "network" in embodiments of this application may be used interchangeably. The term "a plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Further, "at least one of (at least one of) . . . " means one or any combination of subsequent associated objects. For example, "at least one of A, B, and C" includes A, B, C, AB, AC, BC, or ABC.

With continuous development of a digital network, uplink multi-user and large-capacity transmission services such as mobile video backhaul are widely used in 5G and future B5G networks. Limited by bandwidths and spectral efficiency of 5G and future B5G systems, the system has a bottleneck in improving a throughput. A multiple-input multiple-output (MIMO) technology is a key technology for improving a system throughput, and is to increase spectral efficiency of a system by deploying massive antennas on a base station side. However, channel estimation in MIMO requires a large quantity of pilot overheads. As a quantity of users in a network continuously increases, different users may select a same pilot sequence. Because the users send pilots at a fixed and same location, pilot collision occurs. For the foregoing problem, it is necessary to consider a new pilot structure design in a data frame.

Figure 1:
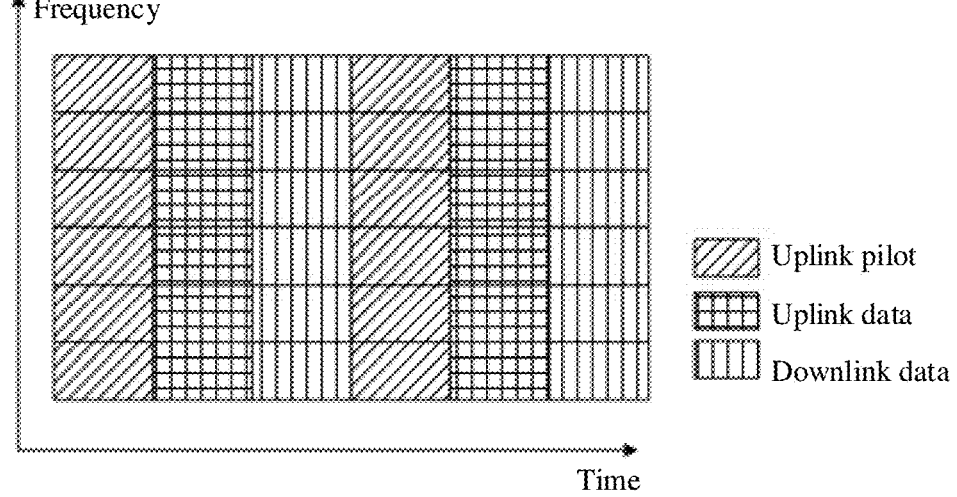
FIG. 1 is a schematic diagram of a frame structure of a massive MIMO system based on a time division duplexing mode.

FIG. 1 is a schematic diagram of a frame structure of a massive MIMO system based on a time division duplexing (TDD) mode. For each user in a cell, a pilot symbol $\phi_k \in \mathbb{C}^{\tau}$ including $\tau$ symbols is first sent, where pilots between different users meet orthogonality:

$$\phi_k^H \phi_j = \begin{cases} \tau, k = j \\ 0, k \neq j \end{cases} \tag{1}$$

$\phi_k$ is a pilot symbol sent by a user k, H is a conjugate transpose operator, $\phi_j$ is a pilot symbol sent by a user j, and K is a positive integer.

For an uplink, a pilot receive signal of a base station can be denoted as follows:

$$y = \sum_{k=1}^{K} h_k \phi_k^T + n \tag{2}$$

$h_k \in \mathbb{C}^m$ is a channel response coefficient of the user k on M receive antennas, and T is a transpose operator. Currently, a pilot symbol of each user is sent on a resource element (RE) that is at a fixed and same location. The base station first performs channel estimation based on the pilot receive signal, and then decodes uplink data. For a TDD system, based on reciprocity between uplink and downlink channels, the base station may send an estimation value of the uplink channel to a user, and the user uses the estimation value as a downlink estimation channel to decode data.

For the massive MIMO system, an uplink receive signal of the massive MIMO system may be written as the following expression:

$$Y_{M \times L} = H_{M \times K} X_{K \times L} + Z_{M \times L} \qquad (3)$$

$H_{M \times K} = [h_1 \ldots h_K]$ is a channel coefficient of K users on M antennas, $X_{K \times L} = [x_1 \ldots x_K]^T$, $x_k \in \mathbb{C}^l$ is a data symbol whose length is L and that is sent by the user K, and $Z_{M \times L}$ is additive white Gaussian noise. To avoid pilot overheads caused by channel estimation in the current system, joint estimation may be performed on the channel coefficient $H_{M \times K}$ and the sent data $X_{K \times L}$ based on the receive signal $Y_{M \times L}$, and may be written as the following expression:

$$(\hat{H}, \hat{X}) = \arg \max P(H, X|Y) \qquad (4)$$

$\hat{H}$ is a channel, $\hat{X}$ is a decoded data symbol, and arg max P indicates probability estimation.

Based on the receive signal $Y_{M \times L}$, in Formula (2), joint estimation of a posterior probability on the channel and the data may be solved by using a low-complexity iterative algorithm, for example, a K-singular value decomposition (K-SVD) algorithm and bilinear generalized approximate message passing (BiG-AMP). The solution of the algorithm may be considered as a problem of large-dimensional matrix decomposition. When the matrix $H_{M \times K}$ or $X_{K \times L}$ is sparse, the algorithm may usually converge to a local optimal solution. The terminal device may use a codeword with a sparse structure, for example, sparse code multiple access (SCMA) and a low density signature (LDS), so that the matrix is sparse.

For the large-dimensional matrix decomposition algorithm such as the K-SVD and the BiG-AMP, phase ambiguity and permutation ambiguity still exist in the estimated channel matrix and codeword matrix:

$$\sum_k \tilde{h}_k \tilde{x}_k^T = \sum_k \hat{h}_{\pi(k)} \theta_{\pi(k)}^{-1} \theta_{\pi(k)} \hat{x}_{\pi(k)}^T \qquad (5)$$

$\tilde{h}$ or $\hat{h}$ indicates an estimated channel vector, $\tilde{x}$ or $\hat{x}$ indicates an estimated codeword vector, $\theta$ indicates an ambiguity phase of the codeword during estimation, a subscript $\pi(k)$ indicates permutation ambiguity during estimation, and $\Sigma$ indicates a summation symbol. Formula (5) is written as a matrix: $(\tilde{H}, \tilde{X}) = (\hat{H}\Pi^{-1}\Theta^{-1}, \Theta\Pi\hat{X})$. A matrix $\Theta$ corresponds to the phase ambiguity, and a matrix $\tilde{H}$ corresponds to the permutation ambiguity. The phase ambiguity means that for any user, phase rotation occurs on both a restored channel coefficient and a sent codeword, and phase rotation of the restored channel coefficient and the sent codeword may counteract. The permutation ambiguity can cause mismatch between a codeword sequence and a user identity document (ID) during decoding.

In an uplink large-capacity transmission scenario, pilot overheads caused by channel estimation need to be reduced or avoided, to further improve spectral efficiency of the system. In addition, in a multi-user scenario, a new pilot pattern needs to be designed to reduce a probability that pilots of users collide, so as to reduce interference between users, and improve estimation precision of system parameters.

According to the solutions, embodiments of this application provide a pilot symbol transmission method and apparatus. In this method, pilot symbols sent by a terminal device are sparse. Therefore, a system can support a large quantity of pilot patterns, to reduce a probability that pilots of users collide.

Technical solutions of embodiments of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

This application describes a system including a plurality of devices, components, modules, and the like to present various aspects, embodiments, or features. It should be understood that each system may include another device, component, module, and the like, and/or may not include all devices, components, modules, and the like described with reference to the accompanying drawings. In addition, combinations of the solutions can be used.

A network architecture and a service scenario described in embodiments of this application are intended to describe technical solutions in embodiments of this application more clearly, and do not constitute any limitation on the technical solutions provided in embodiments of this application. A person of ordinary skill in the art may know that with evolution of a network architecture and emergence of a new service scenario, the technical solutions provided in embodiments of this application are also applicable to a similar technical problem.

Embodiments of this application may be applied to a conventional typical network or a future UE-centric network. A non-cell network architecture is introduced to the UE-centric network. In some embodiments, a large quantity of small cells are deployed in a specific area to form a hyper cell. Each small cell is a transmission point (TP) or a transmission and reception point (TRP) of the hyper cell, and is connected to a centralized controller. When the UE moves in the hyper cell, a network side device selects a new sub-cluster for the UE in real time to serve the UE, to avoid real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In embodiments of this application, an NR network scenario in a wireless communication network is used as an example to describe some scenarios. It should be noted that the solutions in embodiments of this application may further be applied to another wireless communication network, and a corresponding name may also be replaced with a name of a corresponding function in the another wireless communication network.

Figure 2:
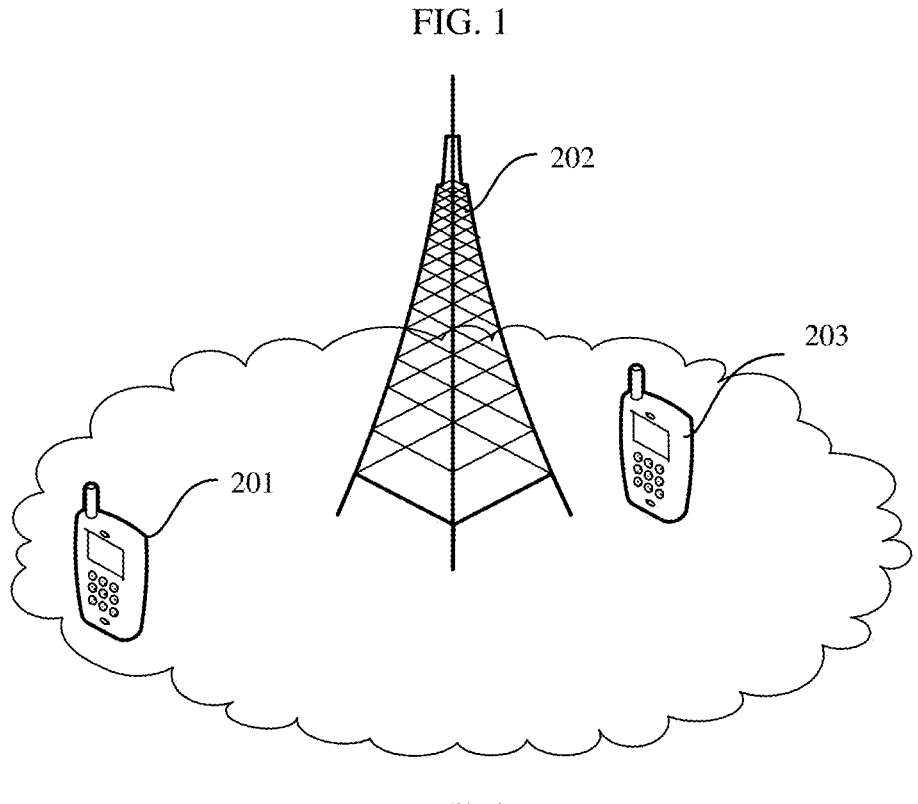
FIG. 2 is a schematic diagram of a communication system applicable to a pilot symbol transmission method according to an embodiment of this application.

To better understand embodiments of this application, the following describes in detail a communication system applicable to embodiments of this application by using a communication system shown in FIG. 2 as an example. FIG. 2 is a schematic diagram of a communication system applicable to a pilot symbol transmission method according to an embodiment of this application. As shown in FIG. 2, a communication system 200 includes a terminal device 201 and a network device 202. A plurality of antennas may be configured for each of the terminal device 201 and the network device 202. Optionally, the communication system may further include a terminal device 203, and the terminal device 203 may also be configured with a plurality of antennas.

The terminal device in this application includes a device that provides a voice and/or data connectivity for a user. In some embodiments, the terminal device includes a device that provides a voice for the user, includes a device that provides data connectivity for the user, or includes a device that provides a voice and data connectivity for the user. For example, the terminal device may include a handheld device with a wireless connection function, or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a satellite, a unmanned aerial vehicle, a balloon, an airplane, a mobile terminal device, a device-to-device (D2D) terminal device, a vehicle-to-everything (V2X) terminal device, a machine-to-machine/machine-type communication (M2M/MTC) terminal device, an Internet of things (IoT) terminal device, a subscriber unit, a subscriber station, a mobile station, a remote station, an access point (AP), a remote terminal device, an access terminal device, a user terminal device, a user agent, a user device, or the like. For example, the terminal device may include a mobile phone (which is also referred to as a "cellular" phone), a computer with a mobile terminal device, or a portable, pocket-sized, handheld, or computer built-in mobile apparatus. For example, the terminal device may include a device, for example, a personal communication service (PCS) phone, a cordless phone, a session initiation protocol (SIP) phone, a wireless local loop (WLL) station, a personal digital assistant (PDA), or the like. The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example rather than a limitation, the terminal device in embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In embodiments of this application, an apparatus configured to implement a function of the terminal device may be a terminal device, or may be an apparatus, for example, a chip system, that can support the terminal device in implementing the function. The apparatus may be installed in the terminal device. In this embodiment of this application, the chip system may include a chip, or may include a chip and another discrete device. The technical solutions provided in embodiments of this application are described by using an example in which the apparatus configured to implement the function of the terminal device is the terminal device.

The network device in this application includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet, and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include a satellite, an unmanned aerial vehicle, a balloon, an airplane, and the like. For example, the network device may include an evolved NodeB (NodeB, eNB, or e-NodeB) in a long term evolution (LTE) system or a long term evolution-advanced (LTE-A) system, a next generation NodeB (gNB) in an evolved packet core (EPC) network, the 5th generation (5G) mobile communication technology, and a new radio (NR) system, a central unit (CU) and a distributed unit (DU) in a cloud radio access network (Cloud RAN) system, an access point AP in a Wi-Fi-6 (802.11ax) communication system, or an AP in a next generation wireless local area network WLAN communication system such as Wi-Fi-7 (802.11be). This is not limited in this embodiment of this application.

In embodiments of this application, an apparatus configured to implement a function of the network device may be a network device, or may be an apparatus, for example, a chip system, that can support the network device in implementing the function. The apparatus may be installed in the network device. The technical solutions provided in embodiments of this application are described by using an example in which the apparatus configured to implement the function of the network device is the network device.

An embodiment of this application provides a new sparse pilot structure, which may be referred to as a central placement pilot structure. For any user in a system, L symbols of a codeword sent by the user may be divided into two parts. The first part includes $L_0$ pilot symbols, and the pilot symbols include $N_0$ non-zero pilot symbols. The second part includes $L_1$ data symbols, and the data symbols include $N_1$ non-zero data symbols. $N_0$ locations are selected, as pilots from the $L_0$ symbols in the first part of the sent data, and there are a total of $$C_{L_0}^{N_0}$$

arrangement and combination manners. Based on the pilot structure, the codeword sent by a terminal device may be shown in Example 1 to Example 4.

Example 1

Figure 3A:
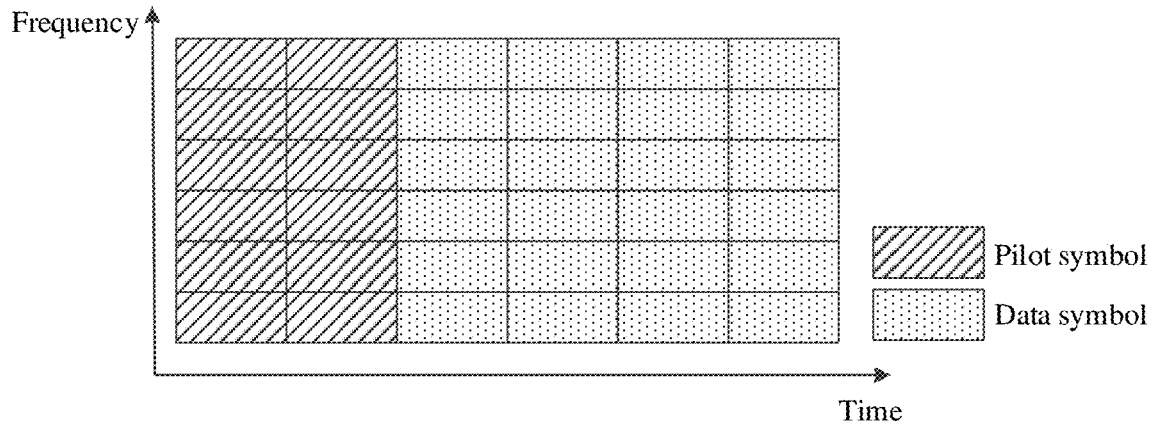
FIG. 3A is a schematic diagram of a time-frequency location of a resource block occupied by a pilot symbol and a time-frequency location of a resource block occupied by a data symbol according to an embodiment of this application.

Refer to FIG. 3A. A time domain resource of a resource block occupied by the pilot symbol in the codeword sent by the terminal device may be before a time domain resource of a resource block occupied by the data symbol. A frequency domain resource of the resource block occupied by the pilot symbol may partially or completely overlap a frequency domain resource of the resource block occupied by the data symbol. The pilot symbol includes a non-zero pilot symbol and a zero pilot symbol, and the data symbol includes a non-zero data symbol and a zero data symbol. The figure does not show the non-zero pilot symbol, the zero pilot symbol, the non-zero data symbol, and the zero data symbol. FIG. 3A shows a relationship between a time domain location and a frequency domain location of the pilot symbol and a time domain location and a frequency domain location of the data symbol.

Example 2

Figure 3B:
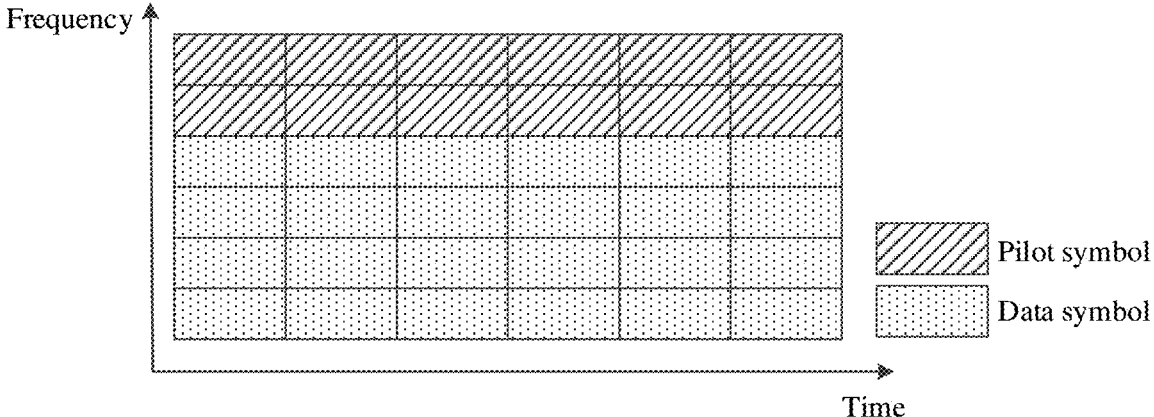
FIG. 3B is a schematic diagram of a time-frequency location of a resource block occupied by a pilot symbol and a time-frequency location of a resource block occupied by a data symbol according to an embodiment of this application.

Refer to FIG. 3B. A frequency domain resource of a resource block occupied by the pilot symbol in the codeword sent by the terminal device may be before a frequency domain resource of a resource block occupied by the data symbol. A time domain resource of the resource block occupied by the pilot symbol may partially or completely overlap a time domain resource of the resource block occupied by the data symbol. The pilot symbol includes a non-zero pilot symbol and a zero pilot symbol, and the data symbol includes a non-zero data symbol and a zero data symbol. The figure does not show the non-zero pilot symbol, the zero pilot symbol, the non-zero data symbol, and the zero data symbol. FIG. 3B shows a relationship between a time domain location and a frequency domain location of the pilot symbol and a time domain location and a frequency domain location of the data symbol.

Example 3

Figure 3C:
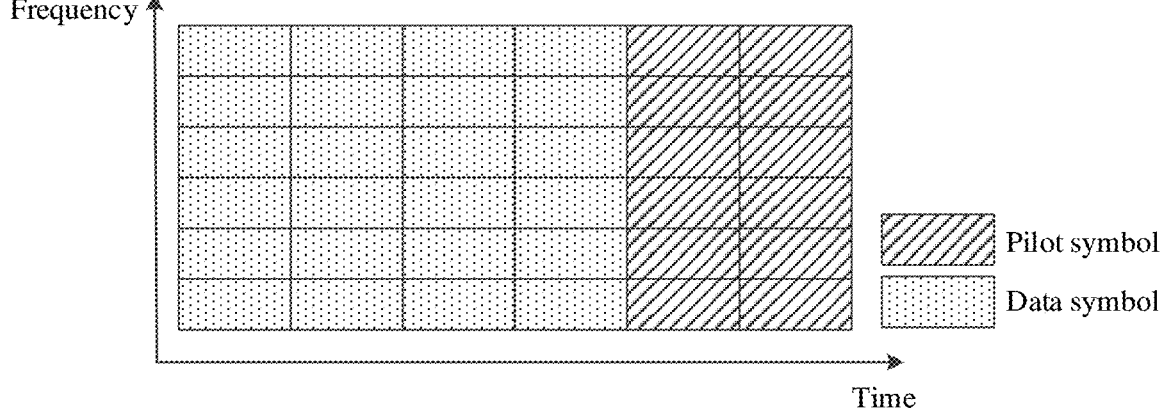
FIG. 3C is a schematic diagram of a time-frequency location of a resource block occupied by a pilot symbol and a time-frequency location of a resource block occupied by a data symbol according to an embodiment of this application.

Refer to FIG. 3C. A time domain resource of a resource block occupied by the pilot symbol in the codeword sent by the terminal device may be after a time domain resource of a resource block occupied by the data symbol. A frequency domain resource of the resource block occupied by the pilot symbol may partially or completely overlap a frequency domain resource of the resource block occupied by the data symbol. The pilot symbol includes a non-zero pilot symbol and a zero pilot symbol, and the data symbol includes a non-zero data symbol and a zero data symbol. The figure does not show the non-zero pilot symbol, the zero pilot symbol, the non-zero data symbol, and the zero data symbol. FIG. 3C shows a relationship between a time domain location and a frequency domain location of the pilot symbol and a time domain location and a frequency domain location of the data symbol.

Example 4

Refer to FIG. 3D. A frequency domain resource of a resource block occupied by the pilot symbol in the codeword sent by the terminal device may be after a frequency domain resource of a resource block occupied by the data symbol. A time domain resource of the resource block occupied by the pilot symbol may partially or completely overlap a time domain resource of the resource block occupied by the data symbol. The pilot symbol includes a non-zero pilot symbol and a zero pilot symbol, and the data symbol includes a non-zero data symbol and a zero data symbol. The figure does not show the non-zero pilot symbol, the zero pilot symbol, the non-zero data symbol, and the zero data symbol. FIG. 3D shows a relationship between a time domain location and a frequency domain location of the pilot symbol and a time domain location and a frequency domain location of the data symbol.

Based on Example 1 to Example 4, the pilot symbols may be centrally placed at a front end or a back end of the data symbols. Therefore, when receiving the codeword, a network device may receive the pilot symbols centrally placed at two ends. This imposes a low complexity requirement on the network device. In Example 1 and Example 2, the time domain resource and/or the frequency domain resource of the pilot symbol may be before the time domain resource and/or the frequency domain resource of the data symbol. In comparison with Example 3 and Example 4, the network device may obtain the pilot symbol at the front end of the codeword, and then perform channel estimation and decoding, to further simplify an operation of the network device.

It should be noted that which pilot structure in Example 1 to Example 4 is used by the terminal device may be indicated by the network device, or specified in a communication protocol. This is not specifically limited in this application.

An embodiment of this application provides another new sparse pilot structure, which may be referred to as a distributed placement pilot structure. For any user in a system, L symbols of a codeword sent by the user may be divided into Q segments, where Q is an integer greater than or equal to 1. A $q^{th}$ segment includes $L_q = L_{q0} + L_{q1}$ symbols, the symbols separately include a pilot symbol whose length is $L_{q0}$ and a data symbol whose length is $L_{q1}$, and $$L = \sum_{q=1}^{Q} L_q.$$

For each segment, time-frequency locations of the pilot symbol and the data symbol may be the same as those in any pilot structure in FIG. 3A to FIG. 3D, and pilot structures used in different segments may be the same. Optionally, the network device may send one piece of indication information for each segment. The indication information may indicate time-frequency locations of a pilot symbol and a data symbol in the segment. For example, as shown in the structure in FIG. 3A, for a first segment, the indication information indicates that a time domain location of a resource block occupied by a pilot symbol in the first segment is before a time domain location of a resource block occupied by a data symbol. As shown in the structure in FIG. 3C, for a second segment, the indication information indicates that a time domain location of a resource block occupied by a pilot symbol in the second segment is after a time domain location of a resource block occupied by a data symbol. The terminal device may determine, based on the indication information of the network device, a pilot structure applicable to each segment.

In addition, time-frequency locations of pilot symbols and data symbols in different segments are independent of each other. FIG. 4A is a schematic diagram of dividing a codeword based on a time domain condition. FIG. 4B is a schematic diagram of dividing a codeword based on a frequency domain condition.

In a possible implementation, the network device may indicate, to the terminal device, whether to divide the codeword based on a time domain condition or a frequency domain condition. Optionally, whether to divide the codeword based on a time domain condition or a frequency domain condition may alternatively be specified in a communication protocol. This is not specifically limited in this application.

According to the solutions, the terminal device may divide the pilot symbol into a plurality of segments, and separately place the segments in different codeword segments. Different transmission gains may be obtained for pilot symbols in different codeword segments, to avoid channel estimation and decoding failures caused by a failure in receiving pilot symbols when channel quality is poor at a time period.

Figure 5:
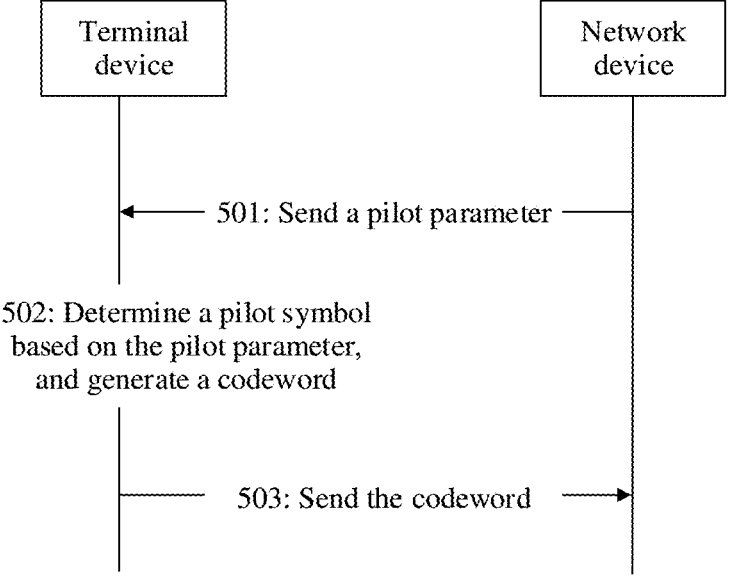
FIG. 5 is a schematic flowchart of a pilot symbol transmission method according to an embodiment of this application.

FIG. 5 is a schematic flowchart of a pilot symbol transmission method according to an embodiment of this application. The method may include the following steps.

Step 501: A network device sends a pilot parameter to a terminal device.

The pilot parameter may be used by the terminal device to generate a pilot symbol. The pilot symbol may include a non-zero pilot symbol and a zero pilot symbol.

The pilot parameter may be used by the terminal device to generate a pilot symbol. The pilot symbol may include a non-zero pilot symbol and a zero pilot symbol.

Step 502: The terminal device determines the pilot symbol based on the pilot parameter, and generates a codeword.

The codeword may include the pilot symbol and a data symbol. The pilot symbol may include the non-zero pilot symbol and the zero pilot symbol. The data symbol may include a non-zero data symbol and a zero data symbol.

Step 503: The terminal device sends the codeword to the network device.

After the network device receives the codeword from the terminal device, because a pilot pattern is determined based on a unique user identifier, the network device may distinguish between different users based on the pilot pattern, to eliminate the permutation ambiguity. For the phase ambiguity, phase rotation may be estimated based on the pilot symbol by using the following expression:

$$\hat{\theta}_k = 1/N_0 \sum_{l=1}^{N_0} \hat{\theta}_k^l \quad (5)$$

$$\hat{\theta}_k^l = \hat{x}_k^l / x_k^l$$

is the phase rotation obtained through estimation based on an $l^{th}$ pilot symbol.

The network device may jointly estimate a channel matrix and a data symbol matrix by using algorithms such as K-SVD and Big-AMP based on the codeword received from the terminal device. An estimated codeword matrix is $$\hat{X} = [\hat{x}_1 \quad \hat{x}_2 \quad \dots \quad \hat{x}_K]^T. \text{ For } \hat{x}_k = [\hat{x}_{k1} \quad \hat{x}_{k2} \quad \dots \quad \hat{x}_{kL}]^T,$$

the network device determines a relationship between the unique user identifier and the data based on a location of a non-zero element in first $L_0$ symbols of a vector, to eliminate the permutation ambiguity. In addition, according to Formula (5), the network device may estimate phase rotation $\hat{\theta}_k$ of data of a user k, to eliminate the phase ambiguity.

According to the solutions, a pilot structure provided in this embodiment of this application can reduce a possibility that pilots on a same time-frequency resource collide, and eliminate the phase ambiguity and the permutation ambiguity.

The following describes information included in the pilot parameter. Based on different pilot structures used by the terminal device, the following two cases are separately described.

Case 1: The terminal device uses a central placement pilot structure.

If the network device indicates the terminal device to generate the pilot symbol by using the central placement pilot structure, the pilot parameter may include one or more pieces of the following information.

(1) A quantity $L_0$ of resource blocks occupied by the pilot symbol: The quantity $L_0$ of resource blocks occupied by the pilot symbol may be determined based on a size of a time-frequency resource occupied by a pilot. For some application scenarios, for example, when the pilot is a preamble sequence, the size of the time-frequency resource occupied by the pilot is preset, and the quantity $L_0$ of resource blocks occupied by the pilot symbol is also a preset value. In this case, quantities $L_0$ of resource blocks occupied by pilot symbols of different terminal devices are the same. Optionally, when the pilot is a preamble sequence, the network device may not send the quantity $L_0$ of resource blocks occupied by the pilot symbol to the terminal device. The quantity $L_0$ of resource blocks occupied by the pilot symbol may be specified in a communication protocol when the pilot is a preamble sequence.

(2) A quantity $N_0$ of resource blocks occupied by the non-zero pilot symbol: The quantity $N_0$ of resources blocks sent by the network device to the terminal device may set a maximum quantity of users who can be supported in a network:

$$K_{max} = C_{L_0}^{N_0} \geq K,$$

where K is a quantity of users currently accessing the network.

Optionally, there may be a first correspondence between the quantity $N_0$ of resource blocks occupied by the non-zero pilot symbol and the quantity $L_0$ of resource blocks occupied by the pilot symbol. The network device may not need to indicate, to the terminal device, the quantity $N_0$ of resource blocks occupied by the non-zero pilot symbol. For example, the network device may send, to the terminal device, the quantity $L_0$ of resource blocks occupied by the pilot symbol and the first correspondence. The terminal device may determine, based on the first correspondence and the quantity $L_0$ of resource blocks occupied by the pilot symbol, the quantity $N_0$ of resource blocks occupied by the non-zero pilot symbol. Alternatively, the first correspondence may be specified in the communication protocol. The network device may send, to the terminal device, the quantity $L_0$ of resource blocks occupied by the pilot symbol, and the terminal device may determine, based on $L_0$, the quantity $N_0$ of resource blocks occupied by the non-zero pilot symbol.

(3) Pilot symbol type: The pilot symbol type indicates a type, for example, a Zadoff-Chu sequence (ZC), a discrete Fourier transform (DFT) sequence, a Hadamard product (Hadamard) sequence, or another sequence, of a pilot symbol used by the terminal device. A type of the non-zero pilot symbol in the codeword sent by the terminal device is the same as the type of the pilot symbol.

Optionally, there may be a second correspondence between the pilot symbol type, and $N_0$ or $L_0$. The network device may not send the type of the pilot symbol to the terminal device. The terminal device may determine the type of the pilot symbol based on the quantity $L_0$ of resource blocks occupied by the pilot symbol or the quantity $N_0$ of resource blocks occupied by the non-zero pilot symbol and the second correspondence. The second correspondence may be sent by the network device to the terminal device, or specified in a protocol. This is not specifically limited in this application. Optionally, the communication protocol may specify a unique pilot symbol type.

It should be noted that if the pilot symbol sent by the terminal device is a preamble sequence, the network device may not send the pilot parameter to the terminal device, and the quantity $L_0$ of resource blocks occupied by the pilot symbol, the first correspondence, and the second correspondence may be specified in the communication protocol. The terminal device may determine, based on the quantity $L_0$ of resource blocks occupied by the pilot symbol and the first correspondence that are specified in the communication protocol, the quantity $N_0$ of resource blocks occupied by the non-zero pilot symbol, and determine the pilot symbol type based on the quantity $N_0$ of resource blocks occupied by the non-zero pilot symbol or the quantity $L_0$ of resource blocks occupied by the pilot symbol and the second correspondence.

Case 2: The terminal device uses a distributed placement pilot structure.

If the network device indicates the terminal device to generate the pilot symbol by using the distributed placement pilot structure, the pilot parameter may include one or more pieces of the following information.

(1) A quantity Q of codeword segments: The quantity Q of codeword segments may be understood as a quantity of resource block sets included in the codeword sent by the terminal device, and Q is a positive integer. Different terminal devices may have a same quantity of codeword segments, or may have different quantities of codeword segments.

Optionally, that a quantity of codeword segments of each terminal device is the same and is a fixed value may be specified in the communication protocol.

(2) A quantity $L_{q0}$ of resource blocks occupied by the pilot symbol in each segment: A total quantity $$\sum_{q=1}^{Q} L_{q0}$$

of resource blocks occupied by the pilot symbol in the codeword may be determined based on a time-frequency resource occupied by a pilot. For some application scenarios, for example, when the pilot is a preamble sequence, a size of the time-frequency resource occupied by the pilot is preset, and the total quantity $$\sum_{q=1}^{Q} L_{q0}$$

20 of resource blocks occupied by the pilot symbol in the codeword is also a preset value. In this case, total quantities $$\sum_{q=1}^{Q} L_{q0}$$

of resource blocks occupied by pilot symbols in codewords of different terminal devices are the same. Optionally, when the pilot is a preamble sequence, the network device may not send the total quantity $$\sum_{q=1}^{Q} L_{q0}$$

of resource blocks occupied by the pilot symbol in the codeword to the terminal device. The total quantity $$\sum_{q=1}^{Q} L_{q0}$$

of resource blocks occupied by the pilot symbol in the codeword may be specified in the communication protocol when the pilot is the preamble sequence.

In a possible implementation, the network device determines, based on the total quantity $$\sum_{q=1}^{Q} L_{q0}$$

of resource blocks occupied by the pilot symbol in the codeword and the quantity Q of codeword segments, the quantity $L_{q0}$ of resource blocks occupied by the pilot symbol in each segment. The network device may divide the total quantity $$\sum_{q=1}^{Q} L_{q0}$$

of resource blocks occupied by the pilot symbol in the codeword into Q segments. It should be understood that, when the total quantity $$\sum_{q=1}^{Q} L_{q0}$$

of resource blocks occupied by the pilot symbol in the codeword is divided into Q segments, the total quantity may be evenly or unevenly divided. The network device may indicate, to the terminal device, the total quantity $$\sum_{q=1}^{Q} L_{q0}$$

and the quantity Q of codeword segments, or the quantity $L_{q0}$ of resource blocks occupied by the pilot symbol in each segment.

Optionally, if the network device may indicate, to the terminal device, the total quantity $$\sum_{q=1}^{Q} L_{q0}$$

and the quantity Q of codeword segments, the terminal device may determine the total quantity $$\sum_{q=1}^{Q} L_{q0}$$

of resource blocks occupied by the pilot symbol in the codeword and the quantity Q of codeword segments, to determine the quantity $L_{q0}$ of resource blocks occupied by the pilot symbol in each segment. The terminal device may divide the total quantity $$\sum_{q=1}^{Q} L_{q0}$$

of resource blocks occupied by the pilot symbol in the codeword into Q segments. It should be understood that, when the total quantity $$\sum_{q=1}^{Q} L_{q0}$$

of resource blocks occupied by the pilot symbol in the codeword is divided into Q segments, the total quantity may be evenly or unevenly divided. The division manner may be specified in the communication protocol.

(3) A quantity $N_{q0}$ of resource blocks occupied by the non-zero pilot symbol in each segment: The quantity $N_{q0}$ of resources blocks sent by the network device to the terminal device may set a maximum quantity of users who can be supported in a network:

$$K_{max} = \prod_{q=1}^{Q} C_{L_{q0}}^{N_{q0}} > K,$$

where K is a quantity of users currently accessing the network, and ∏ is a product symbol.

Optionally, there may be a third correspondence between the quantity $N_{q0}$ of resource blocks occupied by the non-zero pilot symbol in each segment and the quantity $L_{q0}$ of resource blocks occupied by the pilot symbol in each segment. The network device may not need to indicate, to the terminal device, the quantity $N_{q0}$ of resource blocks occupied by the non-zero pilot symbol in each segment. For example, the network device may send, to the terminal device, the quantity $L_{q0}$ of resource blocks occupied by the pilot symbol in each segment and the third correspondence. The terminal device may determine, based on the third correspondence and the quantity $L_{q0}$ of resource blocks occupied by the pilot symbol in each segment, the quantity $N_{q0}$ of resource blocks occupied by the non-zero pilot symbol in each segment. Alternatively, the third correspondence may be specified in the communication protocol. The network device may send, to the terminal device, the quantity $L_{q0}$ of resource blocks occupied by the pilot symbol in each segment, and the terminal device may determine, based on $L_{q0}$, the quantity $N_{q0}$ of resource blocks occupied by the non-zero pilot symbol in each segment.

(4) Pilot sequence type: The pilot sequence type indicates a type, for example, a Zadoff-Chu sequence (ZC), a discrete Fourier transform (DFT) sequence, a Hadamard product (Hadamard) sequence, or another sequence, of a pilot symbol used by the terminal device. A type of the non-zero pilot symbol in the codeword sent by the terminal device is the same as the type of the pilot symbol.

In addition, it should be noted that the pilot parameter may be sent to the terminal device by using radio resource control (RRC) signaling. For example, the pilot parameter may be sent to the terminal device by using an RRC reconfiguration message.

The terminal device may determine the pilot symbol based on the pilot parameter, and generate the codeword. The following describes a manner in which the terminal device determines the pilot symbol.

In a possible implementation, the terminal device may determine a used pilot structure. For example, it may be determined that a central placement pilot structure is used, or it may be determined that a distributed placement pilot structure is used. The terminal device may determine, based on the pilot parameter sent by the network device, a used pilot structure. For example, if the pilot parameter includes the quantity $L_0$ of resource blocks occupied by the pilot symbol, it may be determined that the central placement pilot structure is used. If the pilot parameter includes the quantity $L_{q0}$ of resource blocks occupied by the pilot symbol in each segment, it may be determined that the distributed placement pilot structure is used. Optionally, the network device may send a first identifier to the terminal device. The first identifier may indicate to use the central placement pilot structure or the distributed placement pilot structure. Alternatively, the pilot structure used by the terminal device may be specified in the communication protocol.

The following describes, based on the used pilot structure, a manner in which the terminal device determines a time domain location and a frequency domain location of the resource block occupied by the non-zero pilot symbol.

Case 1: The terminal device uses a central placement pilot structure.

The terminal device may determine a time domain resource and a frequency domain resource that are used to send the codeword. The time domain resource and the frequency domain resource that are used to send the codeword may be allocated by the network device to the terminal device. After determining the time domain resource and the frequency domain resource that are used to send the codeword, the terminal device may determine a time-frequency location of the resource block occupied by the pilot symbol and a time-frequency location of the resource block occupied by the data symbol.

For example, if the time domain resource used when the terminal device sends the codeword is six OFDM symbols whose indexes are 1 to 6, and the frequency domain resource is six subcarriers whose indexes are 1 to 6, the time-frequency resource used when the terminal device sends the codeword is 6×6=36 resource blocks. $L_0$ resource blocks are resource blocks occupied by the pilot symbol, and $L_1$ resource blocks are resource blocks occupied by the data symbol. The time domain resource of the resource block occupied by the pilot symbol and the time domain resource of the resource block occupied by the data symbol may be shown in FIG. 3A to FIG. 3D.

The terminal device may determine, in the resource block occupied by the pilot symbol, a time-frequency location of the resource block occupied by the non-zero pilot symbol. The terminal device determines, based on a unique user identifier, the time-frequency location of the resource block occupied by the non-zero pilot symbol. The unique user identifier herein may be an identifier, for example, a radio network temporary identifier (RNTI), that uniquely identifies a user. The following provides descriptions in detail.

(1) The terminal device does not prestore a pilot pattern list.

The terminal device may convert a binary sequence string corresponding to an RNTI bit $b_{RNTI}$ into a decimal index $i=[b_{RNTI}]_{dec}$. The terminal device searches, based on the decimal index i, the $l_0$ resource blocks for locations of the $N_0$ non-zero resource blocks in a greedy search manner. Specifically, $j=N_0$, and a maximum value $n_j > j$ is searched for, so that $$C_{n_j}^j \le i.$$

After determining the maximum value $n_j$, the terminal device may update $$i = i - C_{n_j}^j \text{ and } j = j - 1,$$

and continue to search for a maximum value $$n_i > j, \text{ so that } C_{n_i}^j \le i,$$

until the terminal device determines $N_0$ $n_j$ values, where $\{n_1, n_2, \ldots, n_{n_0}\}$, and $n_j \in [1, L_0]$.

Figure 6A:
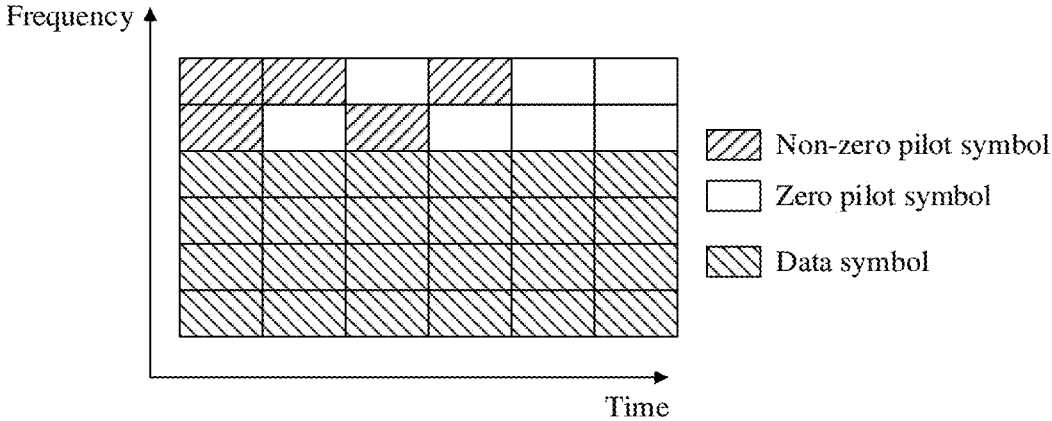
FIG. 6A is a schematic diagram of a time-frequency location of a resource block occupied by a non-zero pilot symbol according to an embodiment of this application.

Refer to FIG. 6A. The time-frequency resource used when the terminal device sends the codeword is $6 \times 6 = 36$ resource blocks. $L_0$ resource blocks are resource blocks occupied by the pilot symbol, and $L_1$ resource blocks are resource blocks occupied by the data symbol. It is assumed that a time domain location of the resource block occupied by the pilot symbol is before a time domain location of the resource block occupied by the data symbol. Indexes of the resource blocks occupied by the pilot symbol are respectively 0, 1, 2, ..., and $L_0-1$. According to a rule of time domain first and then frequency domain, indexes of the resource blocks occupied by the data symbol are respectively 0, 1, 2, ..., and $L_1-1$. The quantity $N_0$ of resource blocks occupied by the non-zero pilot symbol is 5. The RNTI of the terminal device is 1001000, and the binary sequence string of the RNTI is converted into the decimal index i=72. The terminal device may search for a maximum value $n_5 \ge 5$, so that $$C_{n_5}^5 \le 72,$$

and may determine that $n_5=8$. The terminal device updates $$i = 72 - C_{n_5}^5 = 72 - 56 = 16, \text{ and } j = 5 - 1 = 4.$$

The terminal device continues to search for a maximum value $n_4 \ge 4$, so that $$C_{n_4}^4 \le 16,$$

and may determine that $n_4=6$. The terminal device may update $$i = 48 - C_{n_4}^4 = 16 - 15 = 1,$$

and j=4-1=3. The terminal device continues to search for a maximum value $n_3 \ge 3$, so that $$C_{n_3}^3 \le 1,$$

and may determine that $n_3=3$. The terminal device may update $$i = 1 - C_{n_3}^3 = 1 - 1 = 0, \text{ and } j = 3 - 1 = 2.$$

Because a case in which $C_{n_2}^2 \le 0$ does not exist, $n_j=j-1$. The terminal device may determine that $n_2=2-1=1$, and $n_1=1-1=0$. The terminal device may determine, by using the foregoing algorithm, that the $N_0$ locations are respectively $\{8,6,3,1,0\}$. The terminal device may map, according to the rule of time domain first and then frequency domain, the non-zero pilot symbol to resource blocks whose indexes are 8, 6, 3, 1, and 0 in the $L_0$ resource blocks. $L_0-5$ resource blocks in the $L_0$ resource blocks are zero pilot resource blocks. The non-zero data symbol and the zero data symbol are not shown in FIG. 6A, and are represented by using data symbols.

Figure 6B:
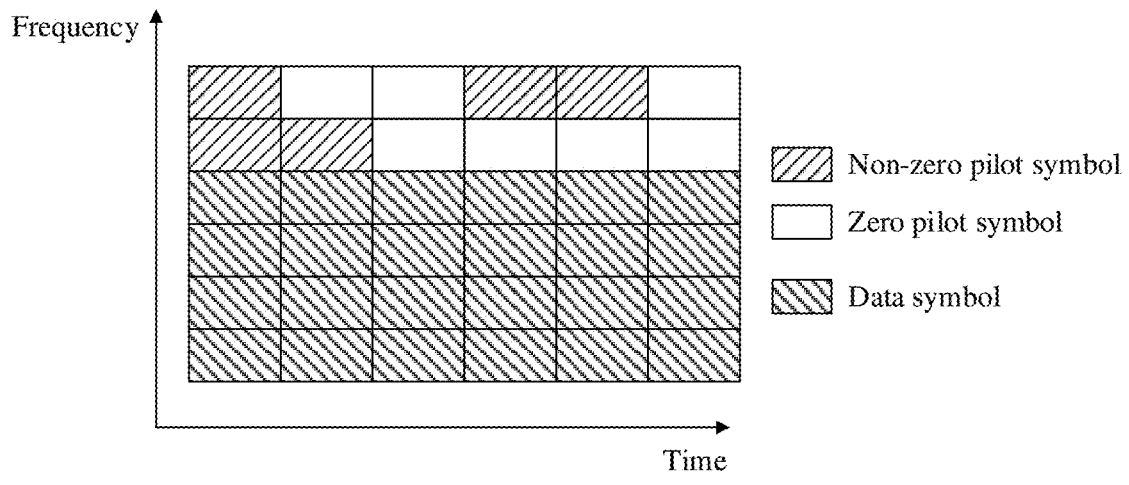
FIG. 6B is a schematic diagram of a codeword dividing manner according to an embodiment of this application.

Refer to FIG. 6B. If the non-zero pilot symbol is mapped, according to a rule of frequency domain first and then time domain, to the resource block occupied by the pilot symbol, a mapping result may be shown in FIG. 6B. The non-zero data symbol and the zero data symbol are not shown in FIG. 6B, and are represented by using data symbols.

(2) The terminal device prestores a pilot pattern list.

The terminal device may determine an index by using the unique user identifier, and search the prestored pilot pattern list for a pilot pattern corresponding to the determined index. The pilot pattern indicates the time-frequency location of the resource block occupied by the non-zero pilot symbol. The terminal device may convert a bit sequence of the unique user identifier into the decimal index i, and search the pilot pattern list for the corresponding pilot pattern. The pilot pattern may store the time domain location and the frequency domain location of the resource block occupied by the non-zero pilot symbol. As shown in the foregoing examples, the index i=72. Therefore, a pilot pattern corresponding to 72 may be searched for in the pattern list, and $\{8,6,3,1,0\}$ is stored in the pilot pattern. The terminal device may map, according to the rule of time domain first and then frequency domain, the non-zero pilot symbol to resource blocks whose indexes are 8, 6, 3, 1, and 0 in the $L_0$ resource blocks, as shown in FIG. 6A. Alternatively, the terminal device may map, according to the rule of frequency domain first and then time domain, the non-zero pilot symbol to the resource block occupied by the pilot symbol, as shown in FIG. 6B.

Case 2: The terminal device uses a distributed placement pilot structure.

(1) The terminal device does not prestore a pilot pattern list.

The terminal device may determine a time domain resource and a frequency domain resource that are used to send the codeword. The time domain resource and the frequency domain resource that are used to send the codeword may be allocated by the network device to the terminal device. After determining the time domain resource and the frequency domain resource that are used to send the codeword, the terminal device divides the resource block occupied by the codeword into Q segment, and determines a time-frequency location of the resource block occupied by the pilot symbol and a time-frequency location of the resource block occupied by the data symbol in each codeword segment.

For example, if the time domain resource used when the terminal device sends the codeword is six OFDM symbols whose indexes are 1 to 6, and the frequency domain resource is six subcarriers whose indexes are 1 to 6, the time-frequency resource used when the terminal device sends the codeword is 6×6=36 resource blocks. If the quantity Q of codeword segments is 3, the terminal device may divide 36 resource blocks used to send the codeword into three segments, and each codeword segment may occupy 12 resource blocks. The terminal device may perform division based on time domain or frequency domain. In each codeword segment, $L_{q0}$ resource blocks are resource blocks occupied by the pilot symbol, and $L_{q1}$ resource blocks are resource blocks occupied by the data symbol.

The terminal device may divide the RNTI into Q segments, to obtain Q RNTI segments. The terminal device may determine, based on each RNTI segment, $N_{q0}$ resource blocks occupied by the non-zero pilot symbol in each code block segment. For one code block segment, the terminal device may convert an RNTI segment of the segment into a decimal index i. The terminal device searches, based on the decimal index i, the $L_{q0}$ resource blocks for locations of the $N_{q0}$ non-zero resource blocks in a greedy search manner. Specifically, $j=N_{q0}$, and a maximum value $n_j>j$ is searched for, so that $$C_{n_j}^j \le i.$$

After determining the maximum value $n_j$, the terminal device may update $$i = i - C_{n_j}^j \text{ and } j = j - 1,$$

and continue to search for a maximum value $n_j>j$, so that $$C_{n_j}^j \le i,$$

until the terminal device determines $N_{q0}$ $n_j$ values, where $\{n_1, n_2, \ldots, n_{N_0}\}$, and $n_j \in [1, L_0]$. The terminal device may determine, by using the foregoing algorithm, resource blocks occupied by $$N_0 = \sum_{q=1}^Q N_{q0}$$

non-zero pilot symbols.

Figure 7A:
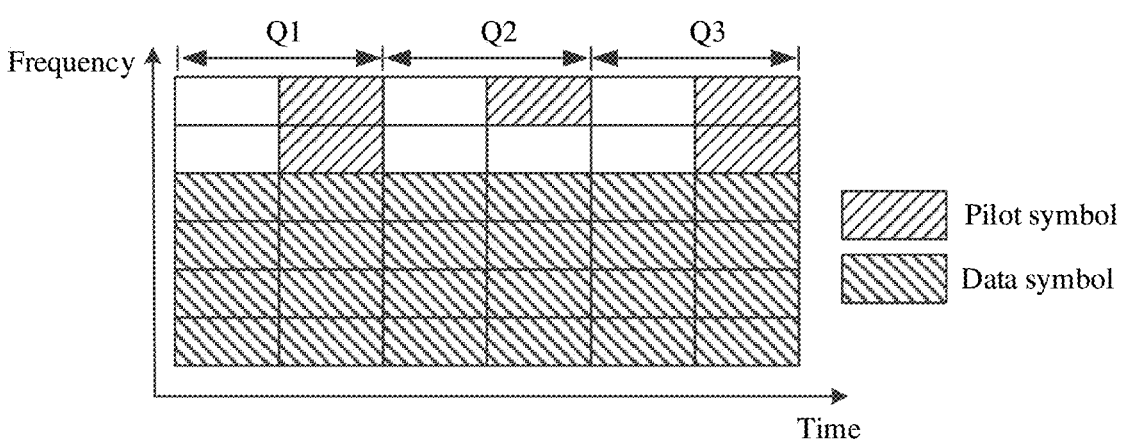
FIG. 7A is a schematic diagram of a codeword dividing manner according to an embodiment of this application.

Refer to FIG. 7A. The time-frequency resource used when the terminal device sends the codeword is 6×6=36 resource blocks. The quantity Q of code block segments is 3, and a time-frequency resource used by each code block segment is 12 resource blocks. For each segment, $L_{q0}$ resource blocks are resource blocks occupied by the pilot symbol, and $L_{q1}$ resource blocks are resource blocks occupied by the data symbol. Indexes of the resource blocks occupied by the pilot symbol are respectively 0, 1, 2, . . . , and $L_{q0}-1$, and indexes of the resource blocks occupied by the data symbol are respectively 0, 1, 2, . . . , and $L_{q1}-1$. A quantity $N_{q0}$ of resource blocks occupied by the non-zero pilot symbol in a first code block segment is 2, a quantity $N_{q0}$ of resource blocks occupied by the non-zero pilot symbol in a second code block segment is 1, and a quantity $N_{q0}$ of resource blocks occupied by the non-zero pilot symbol in a third code block segment is 2. It is assumed that the RNTI is 100100101, the terminal device may divide the RNTI into three segments, and the three segments are respectively 100, 100, and 101. For the first segment, the terminal device may convert 100 into a decimal index 4. The terminal device may determine, by using the foregoing algorithm, that two $n_j$ values in the first segment are respectively 3 and 1. The terminal device may determine that indexes of resource blocks occupied by the non-zero pilot symbol in the first segment are respectively 3 and 1. The rest can be deduced by analogy. The terminal device may also determine resource blocks occupied by the non-zero pilot symbol in the second segment and resource blocks occupied by the non-zero pilot symbol in the third segment, as shown in FIG. 7A. The non-zero data symbol and the zero data symbol are not shown in FIG. 7A, and are represented by using data symbols.

It should be noted that FIG. 7A shows a mapping rule of time domain first and then frequency domain. If the rule of frequency domain first and then time domain is used, when the non-zero pilot symbol is mapped to the resource block occupied by the pilot symbol, a mapping result may be shown in FIG. 7B. The non-zero data symbol and the zero data symbol are not shown in FIG. 7B, and are represented by using data symbols.

Optionally, if the bit sequence of the unique user identifier of the terminal device is short and cannot be divided into Q segments, the terminal device may add a bit 0 to the end of the bit sequence of the unique user identifier, so that a length of the bit sequence of the terminal device may be divided into Q segments. For example, when the RNTI of the terminal device is 1001 and the value of Q is 5, the terminal device may add a bit 0 to the end of the bit sequence of the RNTI, so that the bit sequence of the RNTI changes to 10010, and divide 10010 into Q segments, where each segment includes one bit sequence. After the unique user identifier on which zero padding is performed is divided into Q segments, the terminal device may determine, by using the foregoing algorithm, the time-frequency location of the resource block occupied by the non-zero pilot symbol in each codeword segment.

(2) The terminal device prestores a pilot pattern list.

Figure 7B:
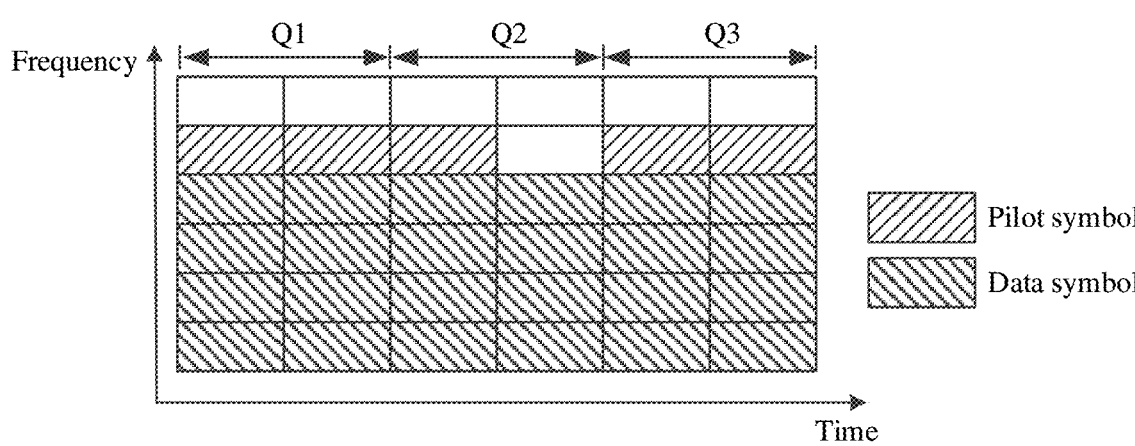
FIG. 7B is a schematic diagram of a codeword dividing manner according to an embodiment of this application.

The terminal device may determine an index by using the unique user identifier, and search the prestored pilot pattern list for a pilot pattern corresponding to the determined index. The pilot pattern indicates the time-frequency location of the resource block occupied by the non-zero pilot symbol. The terminal device may convert a bit sequence of the unique user identifier into the decimal index i, and search the pilot pattern list for the corresponding pilot pattern. The pilot pattern may store the time domain location and the frequency domain location of the resource block occupied by the non-zero pilot symbol. As shown in the foregoing examples, the unique user identifier 100100101 may be converted into a decimal index i=293. Therefore, a pilot pattern corresponding to 293 may be searched for in the pattern list, and {3,1,3,3,1} is stored in the pilot pattern. The terminal device may separately determine, based on a time-frequency location, stored in the pilot pattern, of the resource block occupied by the non-zero pilot symbol and a quantity of resource blocks occupied by the non-zero pilot symbol in each codeword segment, a time-frequency location of the resource block occupied by the non-zero pilot symbol in each codeword segment. The terminal device may map, according to the rule of time domain first and then frequency domain, the non-zero pilot symbol in each codeword segment to $L_{q0}$ resource blocks, as shown in FIG. 7A. Alternatively, the terminal device may map, according to the rule of frequency domain first and then time domain, the non-zero pilot symbol in each codeword segment to $L_{q0}$ resource blocks, as shown in FIG. 7B.

According to the foregoing method, the terminal device may determine, based on the unique user identifier, the time-frequency location of the resource block occupied by the non-zero pilot symbol. Because different terminal devices have different unique user identifiers, determined non-zero pilot symbols are different. Even if some bits of unique user identifiers between two terminal devices are the same, only time-frequency resources of resource blocks occupied by non-zero pilot symbols in some code block segments are the same. According to the foregoing algorithm, the terminal device may determine the time-frequency location of the resource block occupied by the non-zero pilot symbol. Other than the resource blocks occupied by the non-zero pilot symbol, in the resource blocks occupied by the pilot symbol, remaining resource blocks are zero pilot symbols.

For the data symbol, the terminal device may map a data bit to the resource block occupied by the data symbol. When the data bit is mapped, a ratio between a quantity $N_1$ of resource blocks occupied by the non-zero data symbol and a quantity $L_1$ of resource blocks occupied by the data symbol is $$\frac{N_1}{L_1} = \frac{N_0}{L_0}.$$

Alternatively, a ratio between a quantity $L_1-N_1$ of resource blocks occupied by the zero data symbol and a quantity $L_1$ of resource blocks occupied by the data symbol is $$\frac{L_1 - N_1}{L_1} = \frac{L_0 - N_0}{L_0}.$$

Alternatively, a ratio between a quantity $N_1$ of resource blocks occupied by the non-zero data symbol and a quantity $L_1-N_1$ of resource blocks occupied by the zero data symbol is $$\frac{N_1}{L_1 - N_1} = \frac{N_0}{L_0 - N_0}.$$

If a length of the data bit may implement $N_1/L_1=N_0/L_0$ after the data bit is mapped to the resource block occupied by the data symbol, the terminal device may map all data bits to the resource blocks occupied by the data symbol. If the length of the data bit is long, and cannot implement $N_1/L_1=N_0/L_0$, the terminal device may map some data bits to the resource blocks occupied by the data symbol, modulate other data bits in a quadrature amplitude modulation (QAM) manner, and then send the modulated data bits to the network device.

In a possible implementation, a ratio between a quantity $N_0$ of resource blocks occupied by the non-zero pilot symbol and a quantity $L_0$ of resource blocks occupied by the pilot symbol is $N_0/L_0=k$. Alternatively, a ratio between a quantity $N_0$ of resource blocks occupied by the non-zero pilot symbol and a quantity $L_0-N_0$ of resource blocks occupied by the zero pilot symbol is $$\frac{N_0}{L_0 - N_0} = k - 1.$$

Herein, k is sparseness, and k may be less than or equal to $$\frac{1}{4}.$$

For example, k may be $$\frac{1}{5} \text{ or } \frac{1}{20}.$$

A smaller value of k indicates more pilot patterns that can be supported by the network. To save transmission resources, k may be greater than or equal to $$\frac{1}{10}.$$

More specifically, $$k \in \left[\frac{1}{10}, \frac{1}{4}\right].$$

According to the foregoing algorithm, a maximum quantity of pilot patterns that can be supported in this embodiment of this application is equal to $$K_{max} = C_{L_0}^{N_0}.$$

According to an inequality $$C_{L_0}^{N_0} \le 2^{\frac{N_0}{k} H_2(k)},$$

$k=N_0/L_0$ is a sparseness degree of the pilot symbol, and $H_2(k)=-k*\log_2 k-(1-k)*\log_2(1-k)$. For a specified length $N_0$ of the non-zero pilot symbol, the sparseness $k=N_0/L_0$ needs to be as small as possible, so that a quantity of pilot patterns is sufficient for a quantity of users accessing the network.

Figure 8:
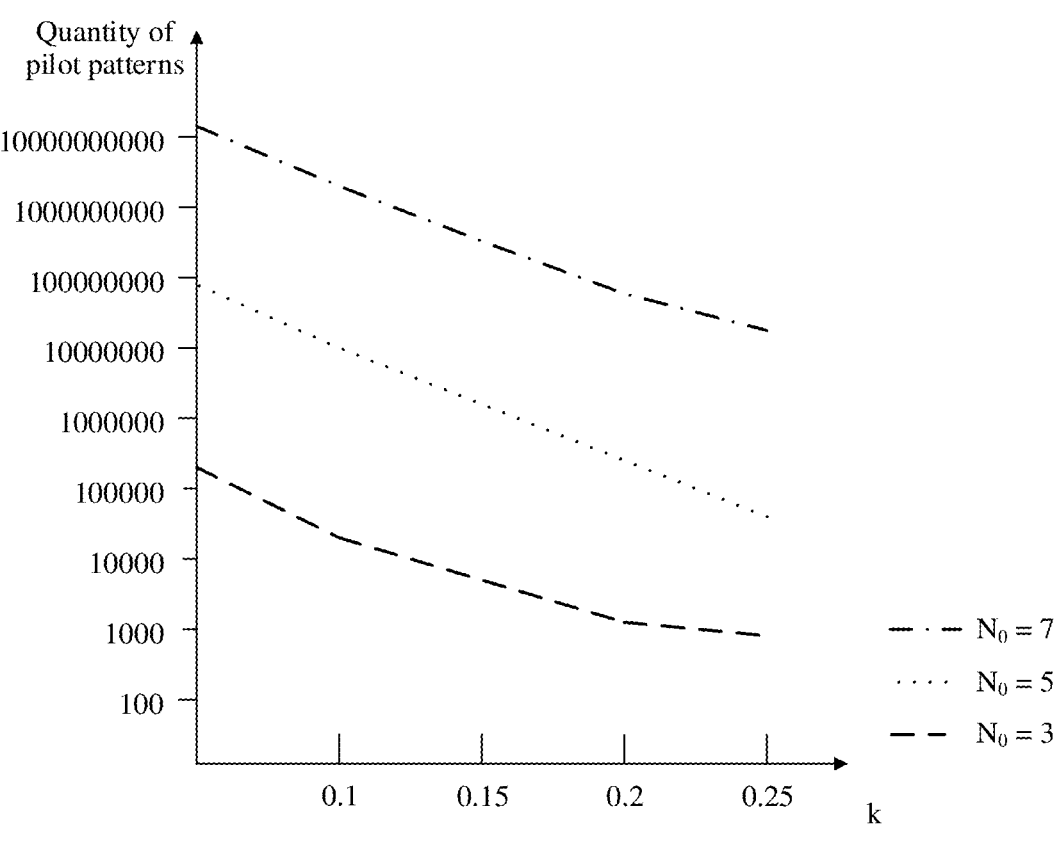
FIG. 8 is a schematic diagram of sparseness and a quantity of pilot patterns according to an embodiment of this application.

FIG. 8 shows a relationship between sparseness $k=N_0/L_0$ and a supported pilot pattern when the length $N_0$ of the non-zero pilot symbol is specified. It can be learned from FIG. 8 that, for a pilot length $N_0=\{5,7\}$, a sparseness interval $$k \in \left[\frac{1}{10}, \frac{1}{4}\right]$$

can better support a quantity of required pilot patterns.

In addition, it should be noted that if $N_0$ is large, for example, greater than or equal to 5, k may be less than or equal to $$\frac{1}{4}.$$

To save transmission resources, k may specifically be greater than or equal to $$\frac{3}{25}.$$

The sparseness interval $$k \in \left[\frac{3}{25}, \frac{1}{4}\right]$$

can better support a required quantity of pilot patterns. If $N_0$ is small, for example, less than 5, k may be less than or equal to $$\frac{1}{5}.$$

To save transmission resources, k may specifically be greater than or equal to $$\frac{1}{15}.$$

The sparseness interval $$k \in \left[\frac{1}{15}, \frac{1}{5}\right]$$

can better support a required quantity of pilot patterns. Therefore, it may be considered that when $N_0$ is small, small sparseness may be set to obtain more pilot patterns. For example, the set k may belong to $$\left[\frac{1}{15}, \frac{1}{5}\right] \text{ or } \left[\frac{1}{15}, \frac{3}{25}\right].$$

When $N_0$ is large, large sparseness may be set to save transmission resources. For example, the set k may belong to $$\left[\frac{3}{25}, \frac{1}{4}\right] \text{ or } \left[\frac{1}{10}, \frac{3}{25}\right].$$

Optionally, the time-frequency location of the resource block occupied by the non-zero symbol may be indicated by the network device. The network device may send, to the terminal device an index table of the resource blocks occupied by the non-zero pilot symbol. The index table may include $N_0$ indexes, and each index may be used to determine a time-frequency location of a resource block occupied by one non-zero pilot symbol.

Figure 9:
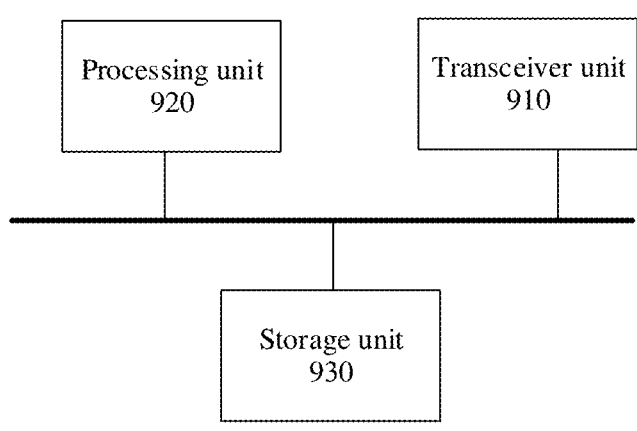
FIG. 9 is a schematic diagram of a communication apparatus according to an embodiment of this application.

Based on the same technical idea as the foregoing communication method, as shown in FIG. 9, an apparatus 900 is provided. The apparatus 900 can perform steps performed by the terminal device side and the network device side in the foregoing method. To avoid repetition, details are not described herein again.

The apparatus 900 includes a transceiver unit 910 and a processing unit 920, and optionally, further includes a storage unit 930. The processing unit 920 may be separately connected to the storage unit 930 and the transceiver unit 910, or the storage unit 930 may be connected to the transceiver unit 910. The processing unit 920 may be integrated with the storage unit 930. The transceiver unit 910 may also be referred to as a transceiver machine, a transceiver, a transceiver apparatus, or the like. The processing unit 920 may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 910 is configured to perform a sending operation and a receiving operation on the terminal device side and the network device side in the method embodiments, and the processing unit 920 is configured to perform an operation other than the receiving and sending operations on the terminal device side and the network device side in the method embodiments. For example, in an implementation, the transceiver unit 910 is configured to perform a receiving operation on the terminal device side and the network device side or a sending operation on the terminal device side and the network device side in FIG. 5, and/or the transceiver unit 910 is further configured to perform other sending and receiving steps on the terminal device side and the network device side in embodiments of this application. The processing unit 920 is configured to perform a processing step on the terminal device side in FIG. 5, and/or the processing unit 920 is further configured to perform other processing steps on the terminal device side and the network device side in embodiments of this application.

The storage unit 930 is configured to store a computer program.

For example, when the apparatus 900 is configured to perform a step performed on the terminal device side, the transceiver unit 910 is configured to receive a pilot parameter from a network device. For the pilot parameter, refer to related descriptions in the method embodiment shown in FIG. 5. Details are not described herein again. The processing unit 920 is configured to generate a codeword. The codeword includes a pilot symbol and a data symbol. For the pilot symbol and the data symbol, refer to related descriptions in the method embodiment shown in FIG. 5. Details are not described herein again. The transceiver unit 910 is configured to send the codeword to the network device.

In a possible design, the processing unit 920 is further configured to determine, based on a unique user identifier, a time domain location and a frequency domain location of a resource block occupied by a non-zero pilot symbol. For a manner of determining a time-frequency location of the resource block occupied by the non-zero pilot symbol, refer to related descriptions in the method embodiment shown in FIG. 5. Details are not described herein again.

In a possible design, the processing unit 920 is specifically configured to: convert the unique user identifier into a decimal index i; determine a maximum value $n_j$, so that $$C_{n_j}^j \le i,$$

where $n_j > j$, $j=N_0$, and $N_0$ is a quantity of non-zero pilot symbols; update values of i and j, where $$i = i - C_{n_j}^j, \text{ and } j = j - 1;$$

return to perform the step of determining the maximum value $n_j$, so that $$C_{n_j}^i \le i;$$

and when determining that there is no maximum value $n_j$ to set $$C_{n_j}^j \le i,$$

determine, based on a plurality of determined $n_j$ values, time domain locations and frequency domain locations of the resource blocks occupied by the $N_0$ non-zero pilot symbols.

When the apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit. The transceiver unit may input data and output data, and the processing unit may determine the output data based on the input data. For example, the transceiver unit may input a pilot parameter. The processing unit may generate output data, for example, a pilot symbol and a codeword, based on input data, for example, the pilot parameter. The transceiver unit may output the codeword.

For example, when the apparatus 900 is configured to perform a step performed on the network device side, the transceiver unit 910 is configured to send the pilot parameter to a terminal device. The transceiver unit 910 is further configured to receive the codeword from the terminal device. The codeword includes a pilot symbol and a data symbol. For the pilot symbol and the data symbol, refer to related descriptions in the method embodiment shown in FIG. 5. Details are not described herein again. The processing unit 920 is configured to decode the codeword, to determine the data symbol.

In a possible design, the processing unit 920 is further configured to determine a unique user identifier of the terminal device based on a time domain location and a frequency domain location of a resource block occupied by a non-zero pilot symbol. For a manner of determining the unique user identifier, refer to related descriptions in the method embodiment shown in FIG. 5. Details are not described herein again.

When the apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit. The transceiver unit may input data and output data, and the processing unit may determine the output data based on the input data. For example, the transceiver unit may output a pilot parameter, or input a codeword including a pilot symbol. The processing unit may determine output data, for example, a data symbol, based on input data, for example, the codeword including the pilot symbol.

Figures 10, 11:
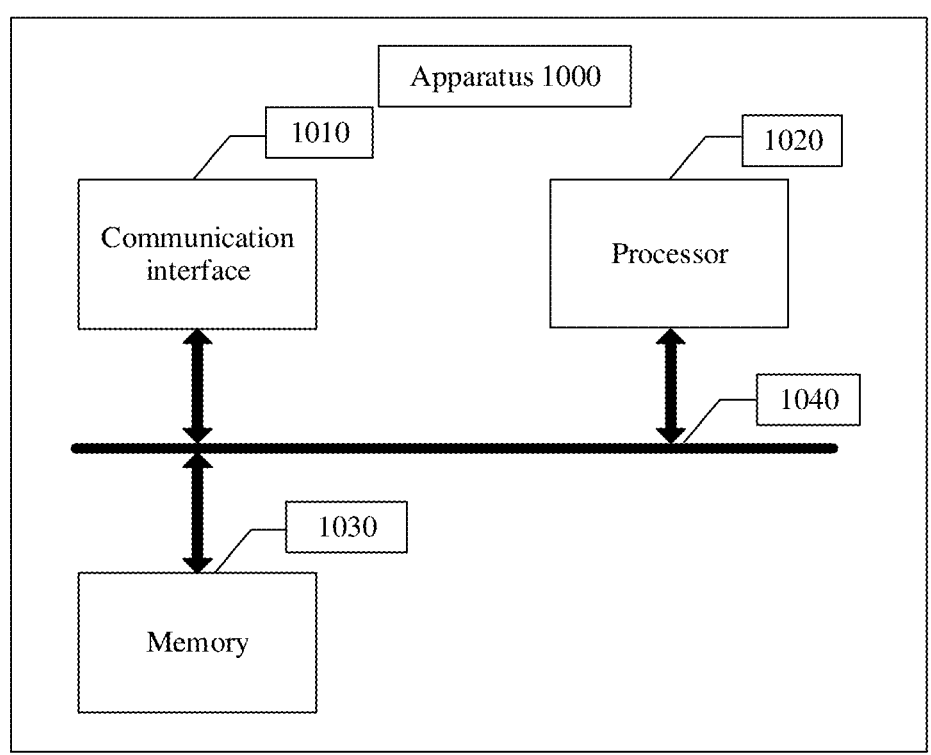
FIG. 10 is a schematic diagram of a communication apparatus according to an embodiment of this application.
FIG. 11 is a schematic diagram of a terminal device according to an embodiment of this application.

FIG. 10 shows an apparatus 1000 with a communication function according to an embodiment of this application, to implement functions of the terminal device or the network device in the foregoing method. When the apparatus is configured to implement the function of the terminal device in the foregoing method, the apparatus may be a terminal device, a chip with a similar function of the terminal device, or an apparatus that can be used in matching with the terminal device. When the apparatus is configured to implement the function of the network device in the foregoing method, the apparatus may be a network device, a chip with a similar function of the network device, or an apparatus that can be used in matching with the network device.

The apparatus 1000 includes at least one processor 1020, configured to implement the function of the terminal device or the network device in the method provided in embodiments of this application. The apparatus 1000 may further include a communication interface 1010. In embodiments of this application, the communication interface may be a transceiver, a circuit, a bus, a module, or another type of communication interface, and is configured to communicate with another device by using a transmission medium. For example, the communication interface 1010 is used for an apparatus in the apparatus 1000 to communicate with another device. The processor 1020 may complete the function of the processing unit 920 shown in FIG. 9, and the communication interface 1010 may complete the function of the transceiver unit 910 shown in FIG. 9.

The apparatus 1000 may further include at least one memory 1030, configured to store program instructions and/or data. The memory 1030 is coupled to the processor 1020. Coupling in embodiments of this application is indirect coupling or a communication connection between apparatuses, units, or modules, and may be in an electrical, mechanical, or another form, and is used for information exchange between the apparatuses, units, or modules. The processor 1020 may operate with the memory 1030. The processor 1020 may execute the program instructions stored in the memory 1030. At least one of the at least one memory may be included in the processor.

A specific connection medium between the communication interface 1010, the processor 1020, and the memory 1030 is not limited in embodiments of this application. In this embodiment of this application, the memory 1030, the processor 1020, and the communication interface 1010 are connected to each other through a bus 1040 in FIG. 10. The bus is represented by using a thick line in FIG. 10. A connection manner between other components is only an example for description, and is not limited thereto. The bus may be classified into an address bus, a data bus, a control bus, or the like. For ease of indication, the bus is indicated by using only one bold line in FIG. 10. However, it does not indicate that there is only one bus or only one type of bus.

An embodiment of this application further provides a terminal device. The terminal device may be a terminal device or may be a circuit. The terminal device may be configured to perform an action performed by the terminal device in the foregoing method embodiment.

FIG. 11 is a simplified schematic structural diagram of a terminal device. For ease of understanding and ease of illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The processor may execute the software program stored in the memory, so that the terminal device performs the steps performed by the terminal device in the foregoing method embodiment. Details are not described again. The antenna is mainly configured to transmit and receive a radio frequency signal in a form of an electromagnetic wave. An input/output apparatus, for example, a touchscreen, a display screen, or a keyboard, is mainly configured to: receive data entered by a user, and output data to the user. It should be noted that some types of terminal devices may not have an input/output apparatus.

When data needs to be sent, the processor performs baseband processing on to-be-sent data, and outputs a baseband signal to the radio frequency circuit. The radio frequency circuit performs radio frequency processing on the baseband signal, and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, FIG. 11 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in embodiments of this application.

In this embodiment of this application, the antenna and the radio frequency circuit that have receiving and sending functions may be considered as a communication unit in the terminal device. For example, in the communication unit 1110 shown in FIG. 11, the processor having a processing function is considered as a processing unit, for example, the processing unit 1120 in FIG. 11, in the terminal device.

In another form of this embodiment, a computer-readable storage medium is provided, where the computer-readable storage medium stores instructions. When the instructions are executed, the method on the terminal device side or the network device side in the foregoing method embodiments is performed.

In another form of this embodiment, a computer program product including instructions is provided. When the instructions are executed, the method on the terminal device side or the network device side in the foregoing method embodiments is performed.

In another form of this embodiment, a communication system is provided. The system may include at least one terminal device and at least one network device.

It should be understood that, the processor mentioned in the embodiments of this application may be a central processing unit (CPU), the processor may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may further be understood that the memory mentioned in embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, with reference to the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in another manner. For example, the apparatus embodiment described above is merely an example. For example, division into units is merely logical function division and may be another division manner during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in an electronic form, a mechanical form, or another form.

The units described as separate parts may or may not be physically separate, and parts displayed as units may or may not be physical units, in other words, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes various media that can store program code, such as a USB flash drive, a removable hard disk drive, a read-only memory (ROM), a random access memory (RAM), a magnetic disk, and an optical disc.

The foregoing description is merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

36

What is claimed is:

1. A pilot symbol transmission method, comprising:
receiving, by a terminal device, a pilot parameter from a network device, wherein the pilot parameter is used by the terminal device to generate pilot symbols; and
sending, by the terminal device, a codeword to the network device, wherein the codeword comprises the pilot symbols and data symbols, the pilot symbols comprise non-zero pilot symbols and zero pilot symbols, and the data symbols comprise non-zero data symbols and zero data symbols,
wherein
a first quantity of resource blocks occupied by the non-zero pilot symbols, the zero pilot symbols, the non-zero data symbols, and the zero data symbols is k times greater than a second quantity of resource blocks occupied by the non-zero pilot symbols and the non-zero data symbols, and
k is greater than or equal to 4.

2. The pilot symbol transmission method according to claim 1, wherein k is less than or equal to 10.

3. The pilot symbol transmission method according to claim 1, further comprising:
determining, by the terminal device based on a unique user identifier, time domain locations and frequency domain locations of the resource blocks occupied by the non-zero pilot symbols.

4. The pilot symbol transmission method according to claim 1, wherein the codeword comprises Q resource block sets, a $q^{th}$ resource block set comprises the resource blocks occupied by the pilot symbols and the resource blocks occupied by the data symbols, $$\sum_{q=1}^{Q} N_{q0} = N_0,$$

$N_{q0}$ is a quantity of resource blocks in the $q^{th}$ resource block set occupied by the non-zero pilot symbols, $N_0$ is a total quantity of resource blocks in the Q resource block sets occupied by the non-zero pilot symbols, Q is an integer greater than or equal to 1, $N_0$ is greater than or equal to 1, $N_{q0}$ is greater than or equal to 0, and less than or equal to No, and q belongs to [1, Q].

5. The pilot symbol transmission method according to claim 4, wherein a time domain location and a frequency domain location of the resource blocks in an $m^{th}$ resource block set occupied by the non-zero pilot symbols are different from a time domain location and a frequency domain location of the resource blocks in an $n^{th}$ resource block set occupied by the non-zero pilot symbols, and the $m^{th}$ resource block set and the $n^{th}$ resource block set are two of the Q resource block sets.

6. The pilot symbol transmission method according to claim 4, wherein the pilot parameter comprises a value of Q, the quantity of resource blocks in the $q^{th}$ resource block set occupied by the non-zero pilot symbols, and the total quantity of resource blocks in the $q^{th}$ resource block set occupied by the pilot symbols.

7. The pilot symbol transmission method according to claim 1, wherein
the pilot parameter comprises a quantity of resource blocks occupied by the non-zero pilot symbols and a total quantity of resource blocks occupied by the pilot symbols in the codeword.

8. A pilot symbol transmission method, comprising:
sending, by a network device, a pilot parameter to a terminal device, wherein the pilot parameter is used by the terminal device to generate pilot symbols; and receiving, by the network device, a codeword from the terminal device, wherein the codeword comprises the pilot symbols and data symbols, the pilot symbols comprise non-zero pilot symbols and zero pilot symbols, and the data symbol comprises a symbols comprise non-zero data symbols and zero data symbols, wherein a first quantity of resource blocks occupied by the non-zero pilot symbols, the zero pilot symbols, the non-zero data symbols, and the zero data symbols is k times greater than a second quantity of resource blocks occupied by the non-zero pilot symbols and the non-zero data symbols, and k is greater than or equal to 4.

9. The pilot symbol transmission method according to claim 8, wherein k is less than or equal to 10.

10. The pilot symbol transmission method according to claim 8, further comprising:

performing, by the network device, joint channel estimation and decoding based on the pilot symbols and a received signal.

11. The pilot symbol transmission method according to claim 8, wherein the codeword comprises Q resource block sets, a $q^{th}$ resource block set comprises the resource blocks occupied by the pilot symbols and the resource blocks occupied by the data symbols, $$\sum_{q=1}^{Q} N_{q0} = N_0,$$

$N_{q0}$ is a quantity of resource blocks in the $q^{th}$ resource block set occupied by the non-zero pilot symbols, $N_0$ is a total quantity of resource blocks in the Q resource block sets occupied by the non-zero pilot symbols, Q is an integer greater than or equal to 1, $N_0$ is greater than or equal to 1, Ngo is greater than or equal to 0, and less than or equal to $N_0$, and q belongs to [1, Q].

12. A communication apparatus, comprising:

a processor; and a communication interface, wherein the processor and the communication interface cause the communication apparatus to:

process a pilot parameter received from a network device to generate pilot symbols; and send a codeword to the network device, wherein the codeword comprises the pilot symbols and data symbols, the pilot symbols comprise non-zero pilot symbols and zero pilot symbols, and the data symbols comprise non-zero data symbols and zero data symbols, wherein a first quantity of resource blocks occupied by the non-zero pilot symbols, the zero pilot symbols, the non-zero data symbols, and the zero data symbols is k times greater than a second quantity of resource blocks occupied by the non-zero pilot symbols and the non-zero data symbols, and k is greater than or equal to 4.

13. The communication apparatus according to claim 12, wherein k is less than or equal to 10.

14. The communication apparatus according to claim 12, wherein the communication apparatus is further caused to:

determine based on a unique user identifier, time domain locations and frequency domain locations of the resource blocks occupied by the non-zero pilot symbols.

15. The communication apparatus according to claim 12, wherein the codeword comprises Q resource block sets, a $q^{th}$ resource block set comprises the resource blocks occupied by the pilot symbols and the resource blocks occupied by the data symbols $$\sum_{q=1}^{Q} N_{q0} = N_0,$$

$N_{q0}$ is a quantity of resource blocks in the $q^{th}$ resource block set occupied by the non-zero pilot symbols, $N_0$ is a total quantity of resource blocks in the Q resource block sets occupied by the non-zero pilot symbols, Q is an integer greater than or equal to 1, $N_0$ is greater than or equal to 1, Ngo is greater than or equal to 0, and less than or equal to $N_0$, and q belongs to [1, Q].

16. The communication apparatus according to claim 15, wherein a time domain location and a frequency domain location of the resource blocks in an $m^{th}$ resource block set occupied by the non-zero pilot symbols are different from a time domain location and a frequency domain location of the resource blocks in an $n^{th}$ resource block set occupied by the non-zero pilot symbols, and the $m^{th}$ resource block set and the $n^{th}$ resource block set are two of the Q resource block sets.

17. The communication apparatus according to claim 15, wherein the pilot parameter comprises a quantity of resource blocks occupied by the non-zero pilot symbols and a total quantity of resource blocks occupied by the pilot symbols in the codeword.

18. The pilot symbol transmission method according to claim 1, wherein the pilot parameter indicates a quantity of resource blocks occupied by the pilot symbols, in response to the quantity of resource blocks being a first value, the terminal device determines to use a central placement pilot structure for the codeword, and in response to the quantity of resource blocks being a second value, the terminal device determines to use a distributed placement pilot structure for the codeword.

19. The pilot symbol transmission method according to claim 8, wherein the pilot parameter indicates a quantity of resource blocks occupied by the pilot symbols, in response to the quantity of resource blocks being a first value, the terminal device determines to use a central placement pilot structure for the codeword, and in response to the quantity of resource blocks being a second value, the terminal device determines to use a distributed placement pilot structure for the codeword.

20. The communication apparatus according to claim 12, wherein the pilot parameter indicates a quantity of resource blocks occupied by the pilot symbols, and the communication apparatus is further caused to:

in response to the quantity of resource blocks being a first value, determine to use a central placement pilot structure for the codeword; and in response to the quantity of resource blocks being a second value, determine to use a distributed placement pilot structure for the codeword.

* * * * *